US012800098B2

(12) United States Patent
Mazar

(10) Patent No.: US 12,800,098 B2
(45) Date of Patent: Nov. 17, 2026

(54) MOUNT FOR RELEASABLE CLAMPING

(71) Applicant: Doona Holdings Ltd., Quarry Bay (HK)

(72) Inventor: Yoav Mazar, Quarry Bay (HK)

(73) Assignee: DOONA HOLDINGS LTD., Quarry Bay (HK)

(*) Notice: Subject to any disclaimer, the term of this patent is extended or adjusted under 35 U.S.C. 154(b) by 0 days.

(21) Appl. No.: 19/204,869

(22) Filed: May 12, 2025

(65) Prior Publication Data

US 2025/0347385 A1 Nov. 13, 2025

(30) Foreign Application Priority Data

May 13, 2024 (IL) ........................................ 312822

(51) Int. Cl.
*F16M 13/02* (2006.01)
*F16B 2/18* (2006.01)

(52) U.S. Cl.
CPC .......... *F16M 13/022* (2013.01); *F16B 2/185* (2013.01)

(58) Field of Classification Search
CPC ............................ F16M 13/022; F16B 2/185
See application file for complete search history.

(56) References Cited

U.S. PATENT DOCUMENTS 4,852,841 A * 8/1989 Sebring .................... F16B 1/02 24/514
4,854,016 A * 8/1989 Rice .................... A61G 13/101 24/514
D342,013 S 12/1993 Sachs
7,971,838 B2 7/2011 Osborn et al.
D745,380 S 12/2015 Williams et al.
D768,754 S 10/2016 Bennett et al.
9,469,438 B2 10/2016 Nool
9,664,215 B2 * 5/2017 Laird ........................ E05D 5/08
(Continued)

FOREIGN PATENT DOCUMENTS

EM 008920235-0001 4/2022
EM 008920235-0002 4/2022
(Continued)

OTHER PUBLICATIONS

"Accmor Stroller Cup Holder with Phone Holder, Bike Cup Holder, Universal Cup Holder for Uppababy Nuna Doona Strollers, 2-in-1 Cup Phone Holder for Stroller Bike Wheelchair Walker Accessory", Amazon.com, Jul. 2, 2020 https://www.amazon.com/Accmor-Organizer-Universal-Wheelchair-Pushchair/dp/B086TZXKMJ?th=1, 8 pages.

*Primary Examiner* — Anita M King
(74) *Attorney, Agent, or Firm* — Ballard Spahr LLP

(57) ABSTRACT

A mount for releasably clamping to a structure. The mount includes a body with a first jaw and a movable second jaw opposed to the first jaw. The second jaw is biased toward the first jaw and movable to distanced positions to receive the structure. A pivotable latch is connected to the second jaw and movable between closed, open, and locking states. In the locking state of the latch, the second jaw is urged further towards the first jaw such that the jaws are spaced from one another by a locking distance smaller than a clamping distance. A locking mechanism locks the second jaw when the latch is in the locking state. The mount may secure an accessory relative to the structure when clamped.

25 Claims, 20 Drawing Sheets

(56) References Cited

U.S. PATENT DOCUMENTS

| | | | | |
|---|---|---|---|---|
| D825,307 | S | 8/2018 | Peterman et al. | |
| 10,478,363 | B2 * | 11/2019 | Koch | A61G 13/101 |
| 10,577,042 | B2 | 3/2020 | Schoch | |
| 10,660,815 | B2 * | 5/2020 | Katzenstein | F16B 2/10 |
| D911,158 | S | 2/2021 | Jenkins | |
| D954,916 | S | 6/2022 | Sieger | |
| D980,697 | S | 3/2023 | Yang | |
| D980,698 | S | 3/2023 | Yang | |
| D1,033,519 | S | 7/2024 | Hao | |
| D1,081,992 | S | 7/2025 | Talpis et al. | |
| 2007/0119888 | A1 * | 5/2007 | Chuang | B62J 11/00 224/427 |
| 2009/0013507 | A1 * | 1/2009 | Scott | F16B 2/10 24/502 |
| 2011/0158742 | A1 | 6/2011 | Lawson | |
| 2015/0165904 | A1 | 6/2015 | Van Baar | |
| 2015/0286115 | A1 * | 10/2015 | Koch | F16M 11/2078 248/230.4 |
| 2018/0066684 | A1 | 3/2018 | Burnett | |
| 2020/0278078 | A1 | 9/2020 | Janway et al. | |
| 2024/0131996 | A1 * | 4/2024 | Leclerc | B60R 11/00 |

FOREIGN PATENT DOCUMENTS

| | | | |
|---|---|---|---|
| FR | 2872385 | A1 | 1/2006 |
| WO | 2018022721 | A1 | 2/2018 |

* cited by examiner

FIGs. 20A-C

MOUNT FOR RELEASABLE CLAMPING

TECHNOLOGICAL FIELD

The subject matter of the present application relates to a mount. In particular, there is disclosed a mount configured to releasably clamp to a structure so as to secure an accessory relative to the structure. Also disclosed herein is an assembly comprising the mount and an accessory secured thereto.

BACKGROUND

Mounts may be used to interconnect or secure an object or accessory relative to a structure. For example, mounts are available for securing mobile phones relative to motorcycle handlebars, car dashboards and the like. Other types of mounts may be used to secure electronic displays relative to a structure such as a desk. Accessories such as baby hanging toys and the like may also be mounted relative to cots and strollers.

GENERAL DESCRIPTION

The subject matter of the present application refers to a mount configured to releasably clamp to a structure having a clamping dimension so as to secure an accessory relative to the structure.

In accordance with a first aspect of the presently disclosed subject matter, the above mount can comprise:

a body associated with a first jaw;

a second jaw that is opposed to the first jaw and movable with respect thereto from a normally closed position to distanced positions spaced from the first jaw wherein distances between the jaws are greater than the clamping dimension to permit reception of at least a part of the structure between the jaws, the second jaw being resiliently associated with the body such that the second jaw is biased toward the first jaw for closing around the structure in a clamping position of the second jaw defining a clamping distance between the jaws; and a latch pivotably connected with respect to the second jaw.

The latch can be generally located over the second jaw such that it at least partially covers the second jaw. The latch can be movable between a plurality of states, including but not limited to:

(i) a closed state in which the latch covers at least a part of the second jaw in the normally closed position thereof to prevent movement of the second jaw away from the first jaw;

(ii) an open state in which the latch is pivoted relative to the second jaw permitting the second jaw to move from the first jaw to the distanced positions; and (iii) a locking state in which the latch covers at least a part of the second jaw in the clamping position thereof so as to simultaneously urge the second jaw further toward the first jaw and lock the second jaw in a locked position in which the jaws are spaced from one another by a locking distance which is smaller than the clamping distance.

Potential advantages of a mount which self-clamps onto a structure and is lockable in position by a latch for example as described herein may include: simplified use of the mount, whereby closing the latch over the second jaw simultaneously enhances its grip of the structure and locks the second jaw in position. Manually manoeuvring the latch (e.g. pushing on the latch or lifting it) can be easier and substantially quicker as compared, for example, to use of screw mechanisms which are commonly used for tightening. Manoeuvring of a latch may require less strength and/or dexterity and/or time, for example as compared to screw mechanisms.

In certain embodiments, the mount further comprises a locking mechanism configured to lock the second jaw in the locked position when the latch is pivoted to the locking state. Generally, when the second jaw is locked, a structure being clamped between the jaws is firmly grasped by the jaws and cannot be easily released. Further, when the second jaw is locked, substantially no portions of the mount are allowed to move with respect to each other (at least until the latch is lifted). This can enable the mount to act, in the locked state, as a solidified, "single piece" connector which can be especially advantageous for transferring of motion between an accessory attached thereto (e.g. a rocker) and the structure being clamped by the mount (e.g. a stroller, a crib, or the like). The mount can be suitable for transferring different types of motions (e.g. rocking, vibrating).

For simultaneously urging the second jaw towards the first jaw and for locking the second jaw, it is envisaged that the latch may comprise:

an engagement region configured to, when the latch is pivoted to the locking state, engage against the second jaw in the clamping position thereof so as to urge the second jaw to the locked position; and an actuation region configured to, when the latch is pivoted to the locking state, actuate the locking mechanism at least indirectly so as to lock the second jaw in the locked position.

The latch may further comprise at least one contact region which, when the latch is in the open state, is configured to be engaged by the second jaw as the second jaw is moved to the distanced positions so as to correspondingly move the latch away from the body.

In some embodiments, the mount further comprises an anchor that, in a normally lowered position thereof, is substantially housed within the body, the latch being pivotally linked to the anchor such that movement of the latch away from the body correspondingly moves the anchor to a raised position. In certain examples, the anchor is resiliently associated with the body so as to be biased to return to the lowered position from the raised position, which return to the lowered position correspondingly returns the latch toward the body, wherein at least one of the engagement region and the contact region of the returning latch engages the second jaw so as to bias the second jaw toward the first jaw. The anchor may be biased to return to the lowered position by various biasing mechanisms including, but not limited to, mechanical springs (e.g. extension springs), elastomeric elements (for example, bands or straps), magnetic forces, or any other biasing mechanism suitable for causing (e.g. by pulling or otherwise applying a tensile or attractive force) the anchor to return to the lowered position.

Referring again to the locking mechanism which locks the second jaw, in some embodiments, the locking mechanism is at least partially housed within the body of the mount.

The locking mechanism may include various configurations including, but not limited to, geometrically interlocking elements, friction-based locking systems, magnetic locking arrangements, cam-based mechanisms, ratchet and pawl systems, or any combination thereof. Generally, the locking mechanism should enable secure locking of the second jaw at a specific clamping distance from the first jaw.

In some examples, a locking mechanism may include: one or more locating elements having multiple engagement points along them, for example, a locating element may include a rack, a stepped or serrated track, a bar with notches or slots at different heights, or the like; and a locker configured to engage the locating element(s) at a selected engagement point out of the multiple engagement points. The locker may include one or more protrusions, teeth, pins, or other structure suitable for engagement with the locating element(s). The locker may be resiliently biased, spring actuated, elastically deformable and returnable, or otherwise structured to removably yet firmly engage an engagement point of the locking element. In some embodiments, the locking mechanism comprises:

- one or more locating elements (for example, elongate elements such as racks); and
- a locker configured to:
- engage the or each locating element to lock the second jaw in the locked position when the latch is pivoted to the locking state from the open state; and
  - disengage from the or each locating element to release the second jaw from the locked position when the latch is pivoted from the locking state to the open state.

In some embodiments, the locating elements are shaped so that when engaged by the locker, movement of the locker with respect to the locating element (e.g along the locating element) is restricted.

In certain embodiments, the locker is operable between:

- a neutral configuration in which the locker is disengaged from the or each locating element; and
- an extended configuration in which the locker is engaged with the or each locating element,
- the locker being biased to return to the neutral configuration.

In some embodiments, the locker comprises a resilient body that is urgeable from the neutral configuration to the extended configuration.

In some examples, the locker is comprised of interengaging portions which are mechanically coupled to each other and movable with respect to each other so as to enable the locker to be moved between a locking (extended) configuration and an unlocked (or neutral) configuration.

In some embodiments, the mount comprises a pair of opposed and spaced apart locating elements housed in the body, each locating element comprising, for example, a rack; and the locker comprises opposing protrusions such as teeth which correspondingly engage the opposing racks, thereby locking the second jaw in the locked position.

It is considered that the locking mechanism may further comprise a mover configured to be urged, for example, by the actuation region of the latch in the locking state thereof so as to correspondingly urge the locker from the neutral configuration to the extended configuration so as to lock the second jaw in the locked position. In some examples, the mover is substantially housed within the anchor so as to:

- move with the anchor relative to the body as the latch is moved relative to the body; and
- move relative to the anchor to urge the locker to the extended configuration when the latch is moved to the locking state.

According to examples of the present mount, the second jaw may comprise at least one rearwardly disposed leg configured to be at least partially housed within the body, the at least one leg being configured to move within the body as the second jaw is moved relative to the first jaw.

In certain embodiments, an upper end of the at least one leg comprises or is connected to a platform configured to be engaged by:

- the engagement region of the latch when in the locked state thereof so as to urge the second jaw further toward the first jaw; and
- the contact region of the latch when in the open state thereof such that movement of the second jaw away from the first jaw correspondingly raises the latch away from the body.

In some embodiments, a clamping profile defined between the jaws is adjustable, at least in size (i.e. as enabled by distancing (e.g. by pulling) the second jaw away from the first), and, in some embodiments, adjustable in shape. For example, a generally circular clamping profile (e.g. for engaging a substantially cylindrical element of the structure) may be modified to a different profile, for example, a profile which is semi-circular and semi-rectangular, a fully rectangular profile, or other profiles. For adjustment of the clamping profile, the mount may further comprise an adapter which is removably securable, for example to the first jaw so as to provide the first jaw with an alternate clamping profile. Additionally or alternatively, an adapter can be provided with the second jaw for changing its profile. Potential advantages of an adjustable clamping profile may include allowing the mount to engage structures of various profiles, which may also facilitate transfer of the mount between different structures.

In some embodiments, the closed jaws (in the closed state of the second jaw) define a minimal clamping profile or volume between them. The minimal clamping profile can be customized so as to fit certain structures and not fit others. For example, only structures having a clamping dimension which is equal to or larger than the equivalent dimension defined by the by minimal clamping profile, would be suitably and firmly clamped by the jaws.

In some embodiments, the mount comprises a connector via which the accessory is securable to the mount. By securing the mount to a structure, the accessory can be fixedly coupled to the structure via the mount. In some embodiments, the connector is located on a back of the body, generally opposite the jaws. The connector can include means for engaging the accessory, for example, one or more protrusions (e.g. brackets, teeth, arms), magnetic means, adhesive means, pins, screws, or other suitable attachment means for engaging the accessory. In some examples, the mount is integrally attached to the accessory and provided with it. In an example, the connector comprises a rotatable element, e.g a dial that is rotatable relative to the body of the mount such that an angular position of the accessory relative to the body can be set or adjusted.

In some embodiments, the structure in respect of which the mount is clampable comprises a leg or handle of a stroller, wherein the clamping dimension comprises a thickness of the leg or handle of the stroller. In other embodiments, the structure comprises a frame portion (e.g. a rod or column) of a baby's bed or crib, wherein the clamping dimension comprises a thickness of the frame portion.

In accordance with a second aspect of the presently disclosed subject matter, there is disclosed an assembly comprising:

- a mount according to a first aspect of the presently disclosed subject matter; and
- an accessory comprising a rocker.

The rocker may be configured to generate a motion which is substantially transferred through the mount to the structure in respect of which the mount is clamped. In certain examples, the motion may comprise at least one of: rocking; and vibrating. In some embodiments, the mount is capable of imparting the rocking and/or vibrating motion from the rocker to the structure (e.g. stroller, crib) at least when the latch is in its locking state. By having the mount securely and rigidly mounted to the structure, motion generated by the rocker is substantially transferred to the structure rather than being absorbed by the mount so that the rocker moves the structure. In such applications, it may also be preferable for rocking devices to be easily and swiftly mounted and dismounted relative to the structure so that the rocking device can be readily transferred between structures.

It is envisaged that in certain examples, the mount and the accessory may be integrally formed.

The following is a list of Examples of the present disclosure:

EXAMPLE 1

A mount configured to releasably clamp to a structure having a clamping dimension so as to secure an accessory relative to the structure, the mount comprising:

- a body associated with a first jaw;
- a second jaw that is opposed to the first jaw and movable with respect thereto from a normally closed position to distanced positions spaced from the first jaw wherein distances between the jaws are greater than the clamping dimension to permit reception of at least a part of the structure between the jaws, the second jaw being resiliently associated with the body such that the second jaw is biased toward the first jaw for closing around the structure in a clamping position of the second jaw defining a clamping distance between the jaws;
- a latch pivotably connected with respect to the second jaw and movable between:
  - (i) a closed state in which the latch covers at least a part of the second jaw in the normally closed position thereof to prevent movement of the second jaw away from the first jaw;
  - (ii) an open state in which the latch is pivoted relative to the second jaw permitting the second jaw to move from the first jaw to the distanced positions; and
  - (iii) a locking state in which the latch covers at least a part of the second jaw in the clamping position thereof, wherein in the locking state of the latch, the second jaw is locked in a locked position and is urged further towards the first jaw such that the jaws are spaced from one another by a locking distance which is smaller than the clamping distance; and
- a locking mechanism operative to lock the second jaw in the locked position when the latch is pivoted to the locking state.

EXAMPLE 2

The mount of Example 1, wherein the latch comprises at least:

an engagement region configured to, when the latch is pivoted to the locking state, engage against the second jaw so as to urge the second jaw; and an actuation region configured to, when the latch is pivoted to the locking state, actuate the locking mechanism so as to lock the second jaw.

EXAMPLE 3

The mount of Example 2, wherein the latch further comprises at least one contact region which, when the latch is in the open state, is configured to be engaged by the second jaw as the second jaw is moved to the distanced positions so as to correspondingly push the latch away from the body.

EXAMPLE 4

The mount of Example 3, further comprising an anchor that, in a normally lowered position thereof, is substantially housed within the body, the latch being pivotally linked to the anchor such that movement of the latch away from the body correspondingly moves the anchor to a raised position.

EXAMPLE 5

The mount of Example 4, wherein the anchor is resiliently associated with the body so as to be biased to return to the lowered position from the raised position, which return to the lowered position correspondingly returns the latch toward the body, wherein at least one of the engagement region and the contact region of the returning latch engages the second jaw so as to bias the second jaw toward the first jaw.

EXAMPLE 6

The mount of Example 5, wherein the anchor is biased to return to the lowered position by a plurality of extension springs which exert a pulling force that biases the anchor to the lowered position.

EXAMPLE 7

The mount of any one of Examples 1 to 6, wherein the locking mechanism comprises:

- one or more locating elements; and
- a locker configured to:
  - engage the or each locating element to lock the second jaw in the locked position when the latch is pivoted to the locking state from the open state; and
  - disengage from the or each locating element to release the second jaw from the locked position when the latch is pivoted from the locking state to the open state.

EXAMPLE 8

The mount of Example 7, wherein the locker is operable between:

- a neutral configuration in which the locker is disengaged from the or each locating element; and
- an extended configuration in which the locker is engaged with the or each locating element.

EXAMPLE 9

The mount of Example 8, wherein the locker comprises a resilient body or a geometric assembly that is urgeable from the neutral configuration to the extended configuration.

EXAMPLE 10

The mount of any one of Examples 7 to 9, wherein the locking mechanism further comprises a mover configured to be urged by the actuation region of the latch in the locking state thereof so as to correspondingly urge the locker from the neutral configuration to the extended configuration so as to lock the second jaw in the locked position.

EXAMPLE 11

The mount of Example 10 as appended to Example4 or 5, wherein the mover is substantially housed within the anchor so as to:

move with the anchor relative to the body as the latch is moved relative to the body; and move relative to the anchor to urge the locker to the extended configuration when the latch is moved to the locking state.

EXAMPLE 12

The mount of any one of Examples 7 to 11, comprising a pair of opposed and spaced apart locating elements housed in the body, each locating element comprising a rack; and wherein the locker comprises corresponding opposing teeth for engaging the racks to lock the second jaw in the locked position.

EXAMPLE 13

The mount of any one of Examples 1 to 12, wherein the locking mechanism is at least partially housed within the body.

EXAMPLE 14

The mount of any one of the preceding Examples, wherein the second jaw comprises at least one rearwardly disposed leg configured to be at least partially housed within the body, the at least one leg being configured to move within the body as the second jaw is moved relative to the first jaw.

EXAMPLE 15

The mount of Example 14 as appended to any one of Examples 3 to 5, wherein an upper end of the at least one leg comprises a platform configured to be engaged by:

the engagement region of the latch when in the locked state thereof so as to urge the second jaw further toward the first jaw; and the contact region of the latch when in the open state thereof such that movement of the second jaw away from the first jaw correspondingly raises the latch away from the body.

EXAMPLE 16

The mount of any one of the preceding Examples, wherein the latch comprises a lever end which, in the closed and locking state of the latch, at least partially protrudes outwardly with respect to the second jaw to facilitate manual engagement of the latch by a user.

EXAMPLE 17

The mount of any one of the preceding Examples, further comprising an adapter which is removably securable to the first jaw so as to provide the first jaw with an alternate clamping profile.

EXAMPLE 18

The mount of any one of the preceding Examples, further comprising a connector via which the accessory is securable to the mount.

EXAMPLE 19

The mount of Example 18, wherein the connector is mounted or is integrally formed on a back portion of the body, facing away from the first and second jaws.

EXAMPLE 20

The mount of Example 18 or Example 19, wherein the connector comprises a dial that is rotatable relative to the body such that an angular position of the accessory relative to the body can be adjusted.

EXAMPLE 21

The mount of any one of the preceding Examples, wherein the structure in respect of which the mount is clampable comprises a leg or handle of a stroller, wherein the clamping dimension comprises a thickness of the leg or handle of the stroller.

EXAMPLE 22

An assembly comprising:

a mount according to any one of the preceding Examples; and an accessory comprising a rocker.

EXAMPLE 23

The assembly of Example 22, wherein the rocker is configured to generate a motion which is substantially transferred through the mount to the structure in respect of which the mount is clamped, at least when the second jaw is in a locked position.

EXAMPLE 24

The assembly of Examples 22 or 23, wherein the motion comprises at least one of: rocking and vibrating.

EXAMPLE 25

The assembly of any one of Examples 22 to 24, wherein the mount and rocker are integrally formed.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
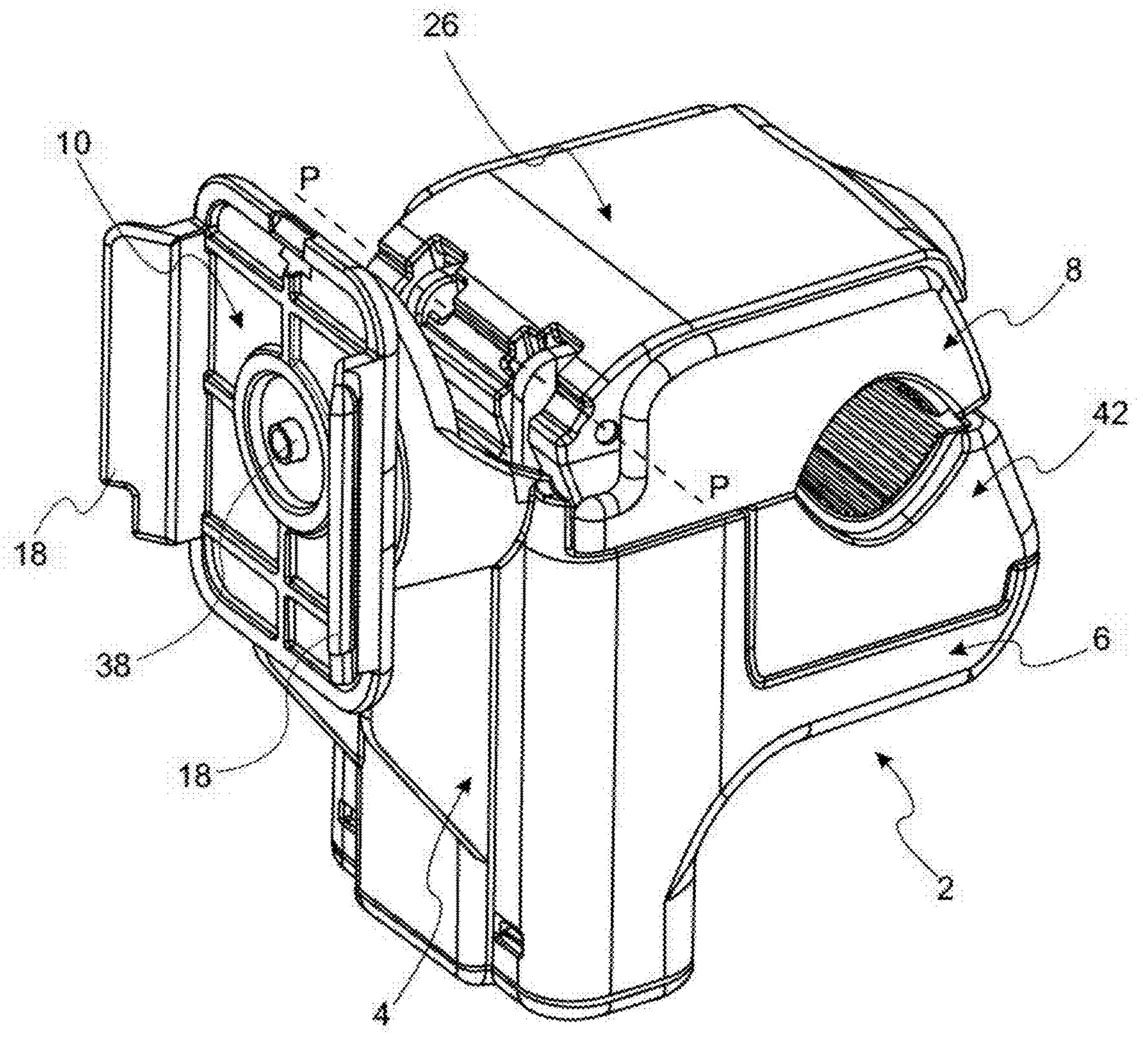
FIG. 1 is a rear perspective view of a mount according to an example of the presently disclosed subject matter.

A mount according to examples of the presently disclosed subject matter is configured to releasably clamp to a structure so as to secure an accessory relative to the structure. The mount comprises a pair of opposed jaws which can be moved relative to one another to enable the mount to clamp to a structure. In particular, the mount comprises a body associated with a first jaw, and a second jaw that is opposed to the first jaw which is movable relative to the first jaw. Starting from a normally closed position wherein the second jaw is generally proximate to the first jaw, the second jaw can be moved to one or more distanced positions wherein the second jaw is spaced from the first jaw. In these distanced positions, the jaws are spaced from one another to permit reception of at least a part of the structure between the jaws. For example, if the structure is the leg of a baby stroller, the distance between the jaws may be greater than a thickness or width of the leg so that the leg can be received between the spaced apart jaws. In other words, the structure may be said to have a clamping dimension (e.g., a thickness or width) and the distance between the jaws when in the distanced positions is greater than the clamping dimension so that at least a part of the structure can be received between the spaced apart jaws.

The second jaw of the mount is resiliently associated with the body thereof so that the second jaw is biased toward the first jaw for closing around the structure. For example, after the second jaw is manually moved away from the first jaw to a distanced position and a structure is received between the spaced apart jaws, the second jaw may be released whereby it returns toward the first jaw so that the two jaws clampingly close around the structure. In this position, it can be said that the second jaw assumes a clamping position, which clamping position defines or corresponds with a clamping distance between the two jaws, the clamping distance being smaller or shorter than the distance between the jaws when the second jaw is in the distanced position.

Examples of the presently disclosed mount also comprise a latch that is pivotally connected with respect to the second jaw. The latch is movable between different states to enable movement and locking of the second jaw. Firstly, the latch can assume a closed state wherein the latch covers at least a part of the second jaw when the second jaw is in the normally closed position. In this state, the closed latch prevents movement of the second jaw away from the first jaw. Secondly, the latch can be pivoted relative to the second jaw to an open state, thereby allowing the second jaw to be moved from the first jaw to the aforementioned distanced positions. In other words, the latch can be moved to the open state to enable the second jaw to be moved away from the first jaw, thereby increasing the distance therebetween so that a structure can be received between the spaced apart jaws.

After the jaws have assumed the clamping position, wherein the jaws have closed around the structure received therebetween, the latch can then be moved to a locking state wherein the latch covers at least a part of the second jaw. In the locking state, the latch may act to further tighten the clamping of the jaws around the structure, and also to lock the second jaw in a locked position so that it is not movable relative to the first jaw unless the latch is first moved to the open state. In particular, in moving the latch to the locking state, the latch urges the second jaw further toward the first jaw so that the distance therebetween, referred to herein as a locking distance, is smaller or shorter than the clamping distance. In other words, after the two jaws have assumed the clamping position wherein the jaws clampingly close around the structure and are separated from one another by the clamping distance, movement of the latch to the locking state further reduces the distance between the jaws to the locking distance, thereby further tightening the jaws around the structure. In other words, movement of the latch to the locking state urges the second jaw to move from the clamping position to the locked position, wherein the locking distance between the two jaws is smaller or shorter than the clamping distance. In some examples, the locking distance is shorter than the clamping distance by, for example, 3 mm, 1 mm, 4 mm or intermediate, longer or shorter length.

The mount according to examples of the present subject matter is thus easy to firmly mount to a structure so as to secure an accessory relative thereto. The mount can thus be securely clamped to a structure such as a stroller handle or leg, and an accessory such as a rocker can be connected to the mount so as to be secured to the stroller. Additionally, the construction of the mount and its clamping connection to the structure is such that a substantial proportion of motion generated by the rocker is transferred to the structure. Therefore, in such mounting applications, a rocking or vibrating motion generated by the rocker is efficiently transferred to the structure (e.g., stroller, crib, etc.) instead of being absorbed by the mount.

While the ensuing disclosure will primarily describe an example mount in relation to a rocker accessory, the present mount may of course be adapted to secure a variety of different accessories relative to different structures. For example, the mount may be adapted to secure: an accessory such as a mobile phone relative to a structure such as a motorcycle handlebar; an object such as an electronic display screen relative to a desk; a hanging toy relative to a child's high chair, stroller, or crib, and so on. As will be discussed, the mount may be provided with any number of different adapters and/or connectors so that it can securely clamp around different structures and secure a variety of accessories relative thereto. An example mount and associated assembly will now be described with reference to the Figures.

FIG. 1 shows a mount 2 according to examples of the present subject matter. The mount 2 comprises a body 4 associated with a first or lower jaw 6, and a second or upper jaw 8 which is opposed to the lower jaw 6. FIG. 1 shows the upper jaw 8 in a normally closed position wherein the two jaws 6, 8 are generally proximate to one another. As will be discussed, the upper jaw 8 is movable with respect to the lower jaw 6 to distanced positions wherein the jaws 6, 8 are generally spaced apart from one another. In particular, the upper jaw 8 is movable to distanced positions wherein a vertical distance between the two jaws 6, 8 is greater than a particular clamping dimension of the structure in respect of which the mount is to be clamped. For example, if the mount 2 is to be clamped to the leg of a stroller having a certain height (e.g. thickness), the height of the leg may be considered a clamping dimension of the structure, and the second jaw 8 is thus movable away from the first jaw 6 to distanced positions wherein a vertical distance between the two jaws 6, 8 is greater than the clamping dimension of the stroller leg. In this way, there is sufficient space between the spaced apart jaws 6, 8 to accept the stroller leg therebetween.

Figure 2:
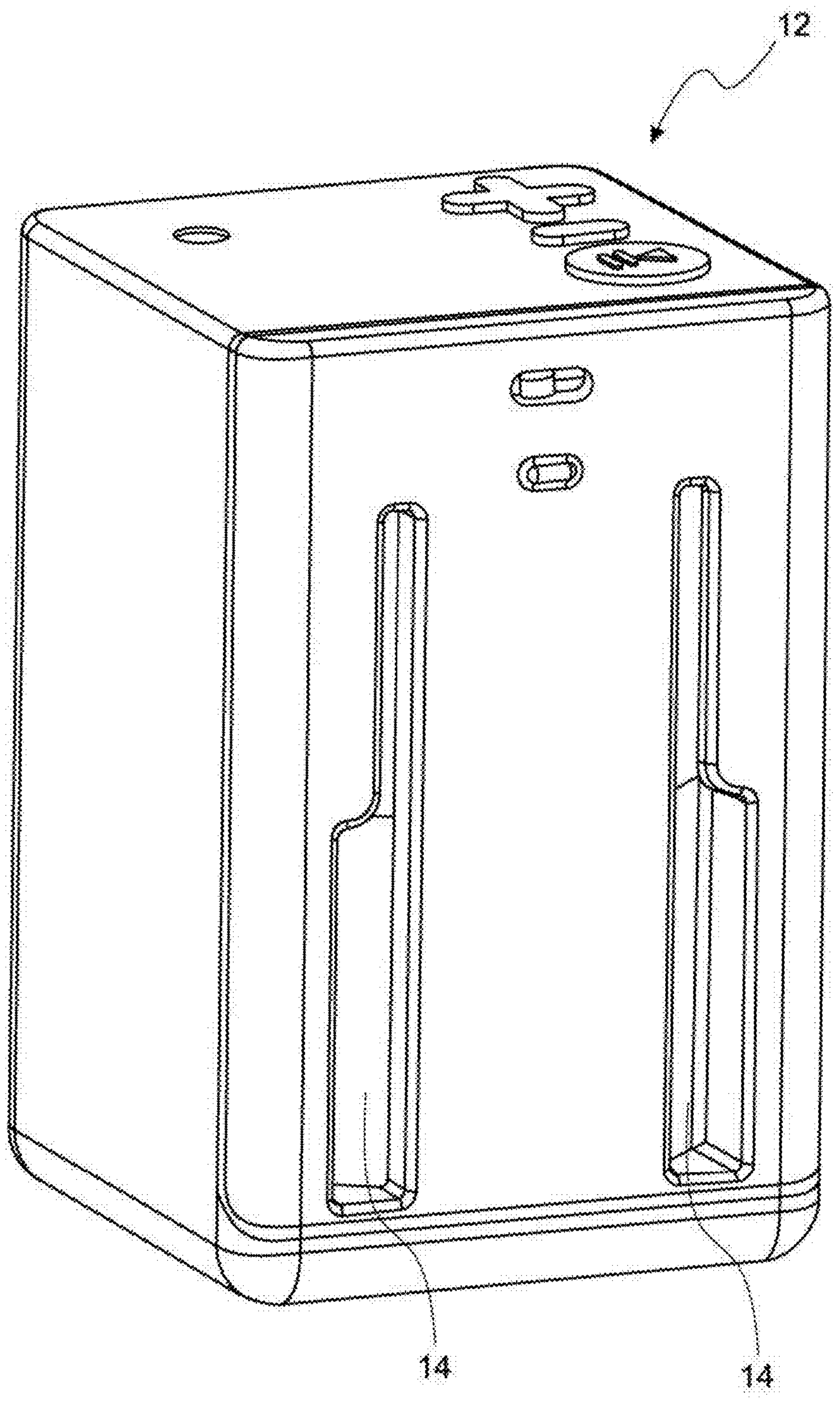
FIG. 2 is a rear perspective view of a rocker, being an accessory that is securable to the mount of FIG. 1.
Figure 3:
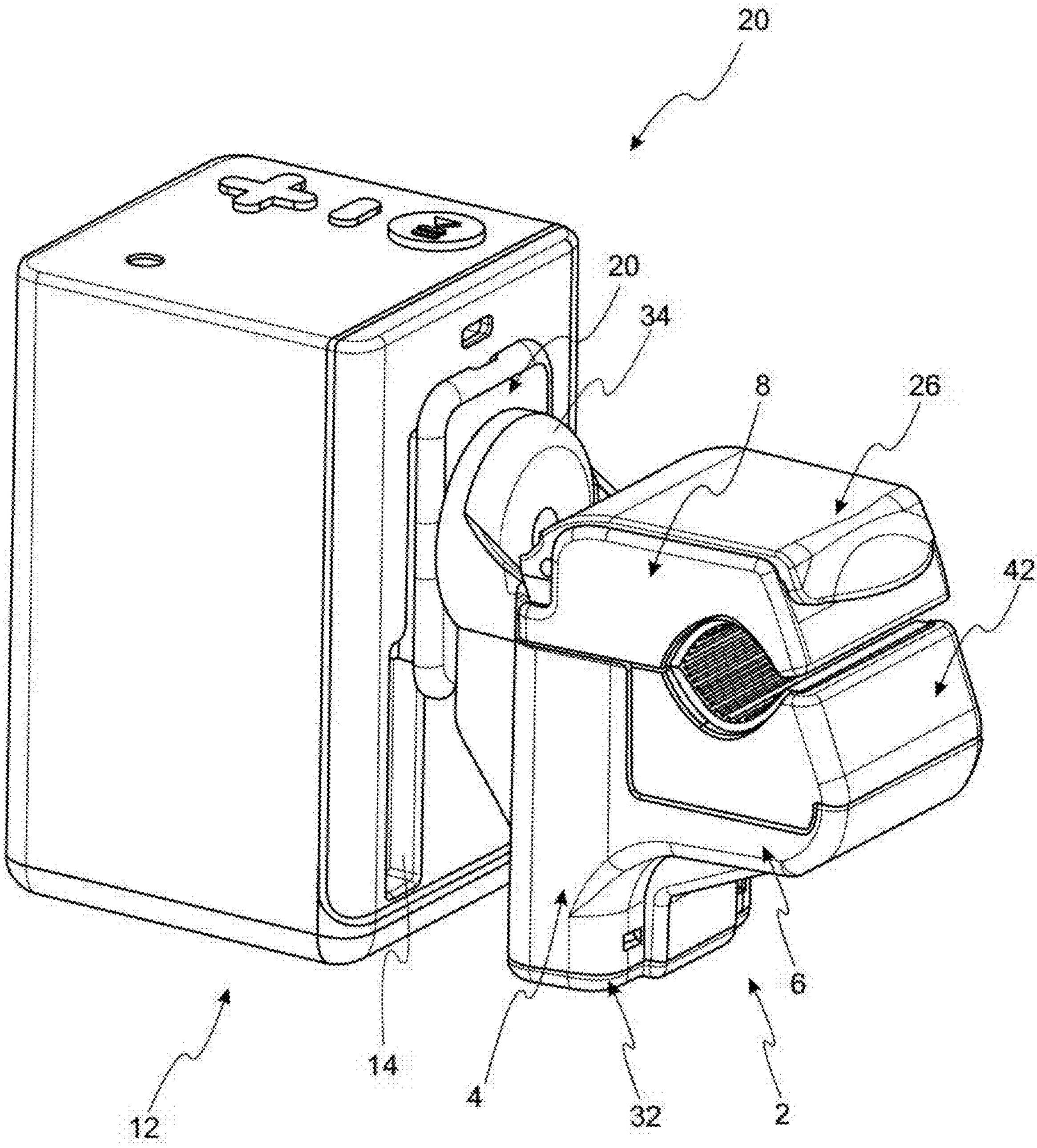
FIG. 3 is a side perspective view of an assembly according to an example of the presently disclosed subject matter, the assembly comprising the mount of FIG. 1 and the rocker of FIG. 2 secured thereto.
Figure 4:
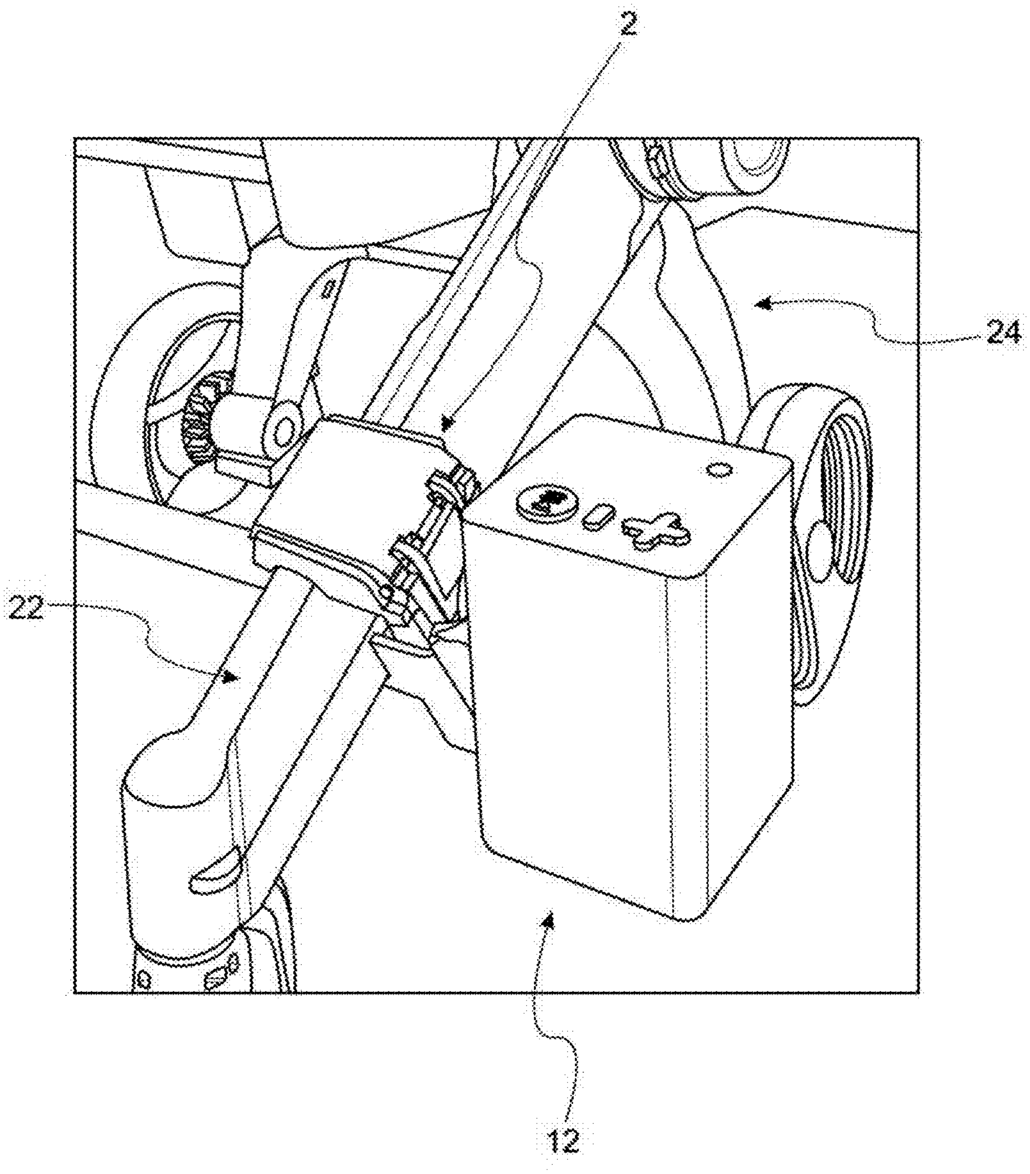
FIG. 4 is an in-situ perspective view of a mount and rocker assembly according to an example of the presently disclosed subject matter, the mount being clamped to a stroller leg so as to secure the rocker relative thereto.

A rear of the depicted mount 2 is provided with a connector 10 adapted to enable connection of an accessory, which in this example comprises a rocker, to the mount. One such rocker 12 is shown in FIG. 2, a rear face of which is configured with a pair of vertically extending and spaced apart slots 14. The connector 10 correspondingly comprises a pair of vertically extending and spaced apart arms 18, each arm 18 being configured to slidingly slot into a respective slot 25 of the rocker 16 so as to secure the rocker 12 relative to the mount 2, as shown in the mount 2 and rocker 16 assembly 20 of FIG. 3. Referring also to FIG. 4, a mount 2 and rocker 16 assembly 20 is shown secured relative to a leg 22 of a stroller 24. In particular, the mount 2 is shown clamped to the leg 22 so as to secure the rocker 16 relative thereto. The rocker 16 can then be activated to impart a rocking and/or vibrating motion, which motion can thus be transferred to the stroller 24 via the mount 2, thereby rocking and/or vibrating the stroller 24. The mount 2 may of course be adapted to mount to other structures, including a handle of the stroller 24. In another example, a different connector may be connected to the rear of the mount 2 and provide an attachment for a different accessory, such as a mobile phone or a drink holder. In such examples, a user may thus mount their mobile phone and/or drink to a rear handle of the stroller 24. As will be discussed, the connector may be adjustably connected to the mount 2 to enable positional adjustment of the accessory as necessary. For example, in the depicted embodiment, the connector 10 is in the form of a dial that can be rotatably adjusted relative to the body 4 of the mount 2. In this way, an angular position of the rocker 16 connected to the connector 10 can be adjusted relative to the mount 2 and thus the stroller 24 in respect of which the mount 2 is secured.

The mount 2 also comprises a manually operable latch 26 that is pivotally connected with respect to the second jaw 8. FIG. 1 shows the latch 26 in a closed state wherein the latch 26 covers at least a part of the upper jaw 8 when the upper jaw 8 is in its normally closed position. In this closed state, the latch 26 acts to prevent movement of the upper jaw 8 away from the first jaw 6. In other words, when the latch 26 is closed over the upper jaw 8, the upper jaw 8 cannot be manually pulled or urged away from the first jaw 6. As will be discussed, the latch 26 can be pivoted to an open state so that it substantially does not cover the upper jaw 8, thereby allowing for movement of the second jaw 8 away from the first jaw 6 to distanced positions wherein a structure can be received between the spaced apart jaws 6, 8. Once a structure is clamped between the pair of jaws 6, 8, the latch 26 can then be pivoted to a locking state wherein the latch 26 covers at least a part of the second jaw 8 and acts to simultaneously urge the second jaw 8 further toward the first jaw 6 and lock the second jaw 8 in the locked positioned, thereby preventing movement of the second jaw 8 away from the first jaw 6 unless the latch 26 is first pivoted to the open state.

Figure 5A:
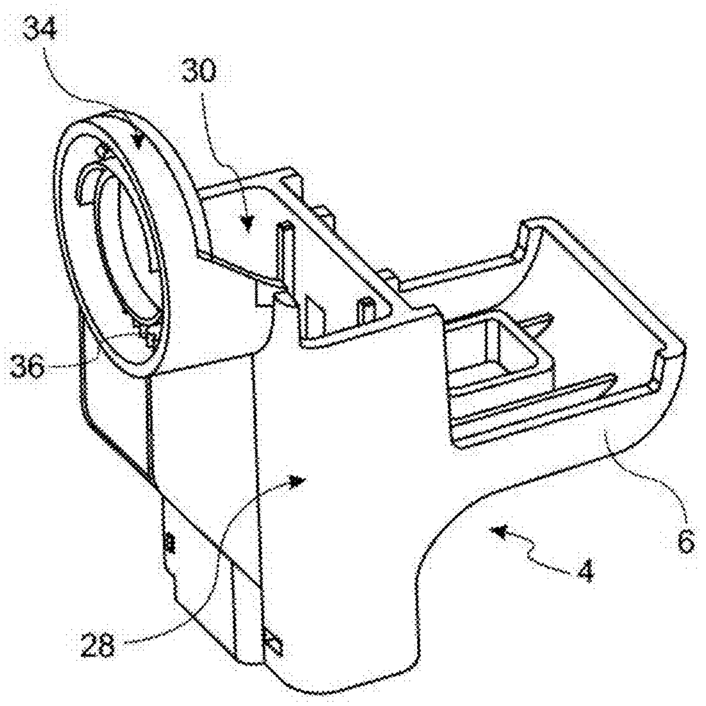
FIG. 5A is a rear perspective view of a body of the mount of FIG. 1.

FIG. 5*a* shows the body 4 of the mount 2 according to the presently depicted embodiment. The body 4 comprises a housing portion 28 having a vertically extending channel or opening 30. A base of the housing portion 28 of the depicted body 4 is closed by a base element 32 that can plug or clip into the bottom of the housing portion 28. As will be discussed, various components, including a rearward portion of the upper jaw 8, are at least partially and movably housed in the housing portion 28 of the body 4. A rear of the housing portion 28 is configured to receive a connector 10 suitable for securing a desired accessory to the mount 2. In the depicted example, the rear of the housing comprises a circular dial-like feature 34 configured to receive the connector 10 shown in FIG. 1. The dial-like feature 34 comprises a series of teeth 36 arranged in a circular formation; a rear of the connector 10 comprises complementary teeth arranged in a circular formation configured to engage with the teeth 36 of the connector 10. In use, the connector 10 can be secured to the dial-like feature 34 of the body 4 via a pin 38 or the like and rotated thereabout whereby the engaged teeth mesh with one another to fix an angular position of the connector 10 relative to the body 4. To adjust an angular position of the connector 10 relative to the body 4, the connector 10 can simply be rotated about the pin 38, thereby causing the teeth of the connector to disengage from the teeth 36 of the dial-like feature 34 so that the connector 10 can rotatingly travel to a subsequent angular position wherein the teeth once again mesh together. In this way, the connector 10 can be 'clicked' through and locked in numerous angular positions, thereby enabling the angular position of the accessory connected to the connector 10 to be adjusted relative to the structure in respect of which the accessory is secured.

Figure 19:
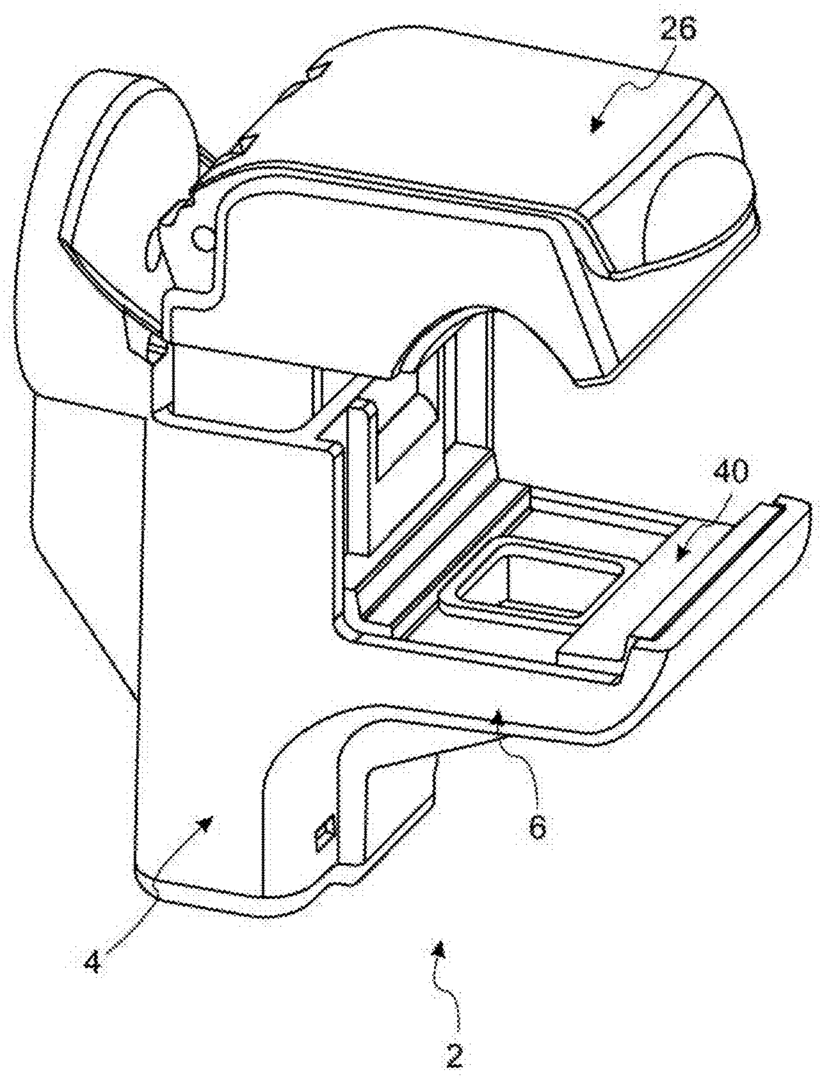
FIG. 19 is a side perspective view of the mount of FIG. 1 wherein the connector thereof is omitted and a first jaw adapter is removed.

A forward portion of the body 4 comprises or is associated with a first or lower jaw 6 of the mount 2, the lower jaw 6 comprising a portion that extends generally forwardly and perpendicularly from the housing portion of the body. Referring also to FIG. 19, the lower jaw portion 6 may be integrally formed with the body 4 and define one of the pair of jaws 6, 8 in between which a structure can be clamped. In the depicted example, a grip pad 40 is shown secured to the lower jaw 6 and may directly receive the structure in respect of which the jaws 6, 8 are to clamp. As will be discussed, the lower jaw 6 of the body 4 may be configured to releasably receive an adapter 42 which can be used to vary the clamping profile of the lower jaw 6. For example, a variety of different adapters with different shapes and geometries may be secured to the lower jaw 6 of the housing body 4 so that the mount 2 can be clamped to different structures with different physical characteristics, geometries, and dimensions.

Figure 5B:
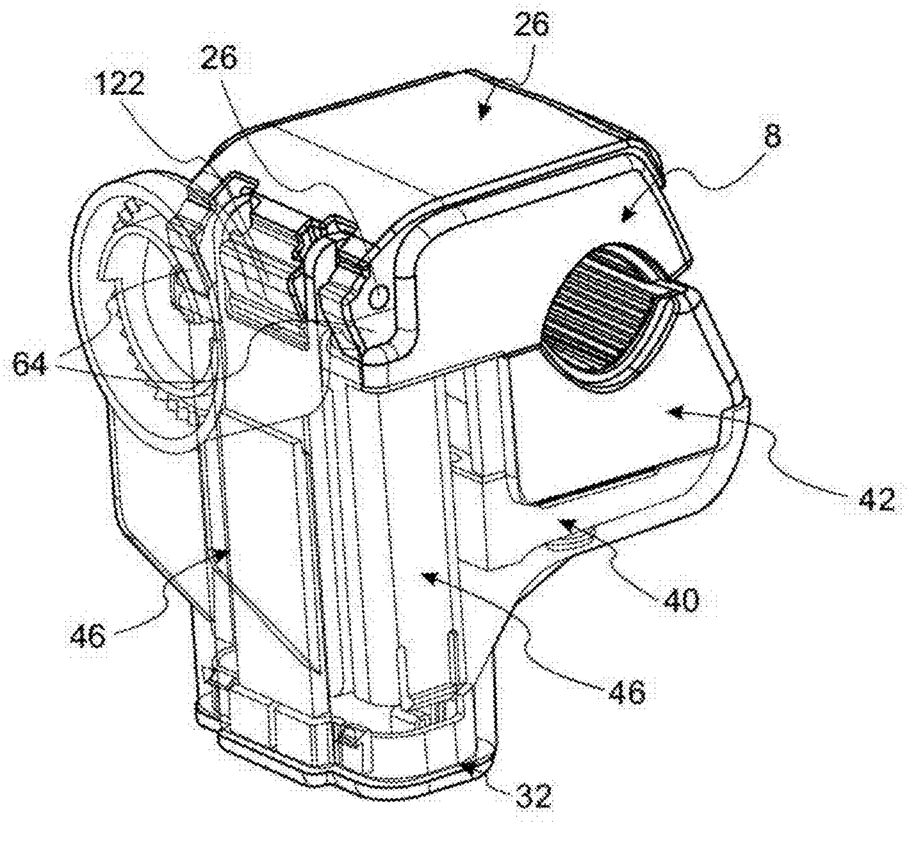
FIG. 5B is a rear perspective view of the mount of FIG. 1 wherein a connector of the mount is omitted and the body is substantially transparent.
Figure 6A:
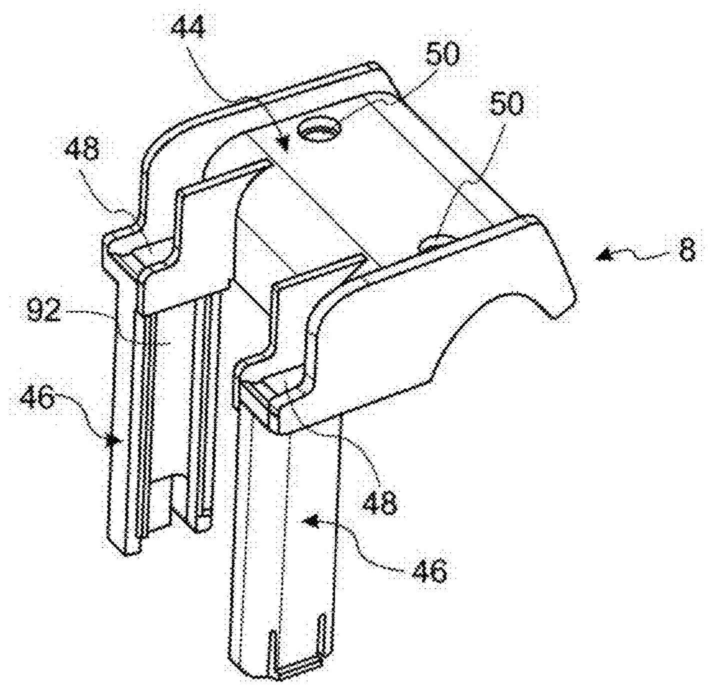
FIG. 6A is a rear perspective view of a second jaw of the mount of FIG. 1.

The second or upper jaw is configured to be at least partially housed in and movable relative to the body of the mount. For example, a rear of the upper jaw may extend into the housing portion of the body and travel therewithin as the upper jaw is moved between the closed, clamping, and locked positions. Moreover, and as will be discussed, the upper jaw is resiliently associated with the body such that the upper jaw is biased to return toward the first jaw. In other words, if the second jaw is manually raised or otherwise moved away from the first jaw, unless the second jaw is maintained away from the first jaw, the second jaw will return toward the first jaw. An example second or upper jaw 8 is shown in FIGS. 5B and 6A. The second jaw 8 comprises a forwardly extending jaw portion 44 which is above and opposed to the lower jaw 6 of the mount 2. A rear of the second jaw 8 comprises a pair of vertically extending and spaced apart legs 46, each configured to be slidingly received in the opening or channel 30 of the housing portion 28 of the body 4. In particular, the legs 46 are configured to travel vertically up and down within the housing portion 28 of the body 4; in this way, the upper jaw 8 can be moved vertically upwardly away from the lower jaw 6 to the distanced positions, and downwardly toward the lower jaw 6 to assume the clamping, locked or normally closed positions. An upper end of each leg 46 of the second jaw 8 comprises a platform region 48 which, as will be discussed, facilitates movement of the latch 26 away from the body 4 of the mount 2. In the depicted example, the jaw portion 44 of the upper jaw 8 also comprises a pair of openings 50 configured to receive respective plugging portions 52 of an upper jaw grip pad 54 (see FIG. 9).

The latch is configured to cooperate with the second jaw. In particular, the latch is movable between different states to selectively, prevent, enable, and lock movement of the second jaw. To this end, the latch comprises an engagement region which is configured to, when the latch is pivoted to the locking state, engage against the second jaw in the clamping position thereof so as to urge the second jaw to the locked position. In certain examples, when the latch is in the open state, the engagement region of the latch is configured to disengage from the second jaw, thereby allowing the second jaw to be moved relative to the first jaw. After the jaws have clamped around a structure, the latch can then be pivoted closed relative to the second jaw, whereby the engagement region of the latch engages against the second jaw so as to further urge the second jaw closer toward the first jaw so as to more tightly clamp the jaws around the structure.

Figure 9:
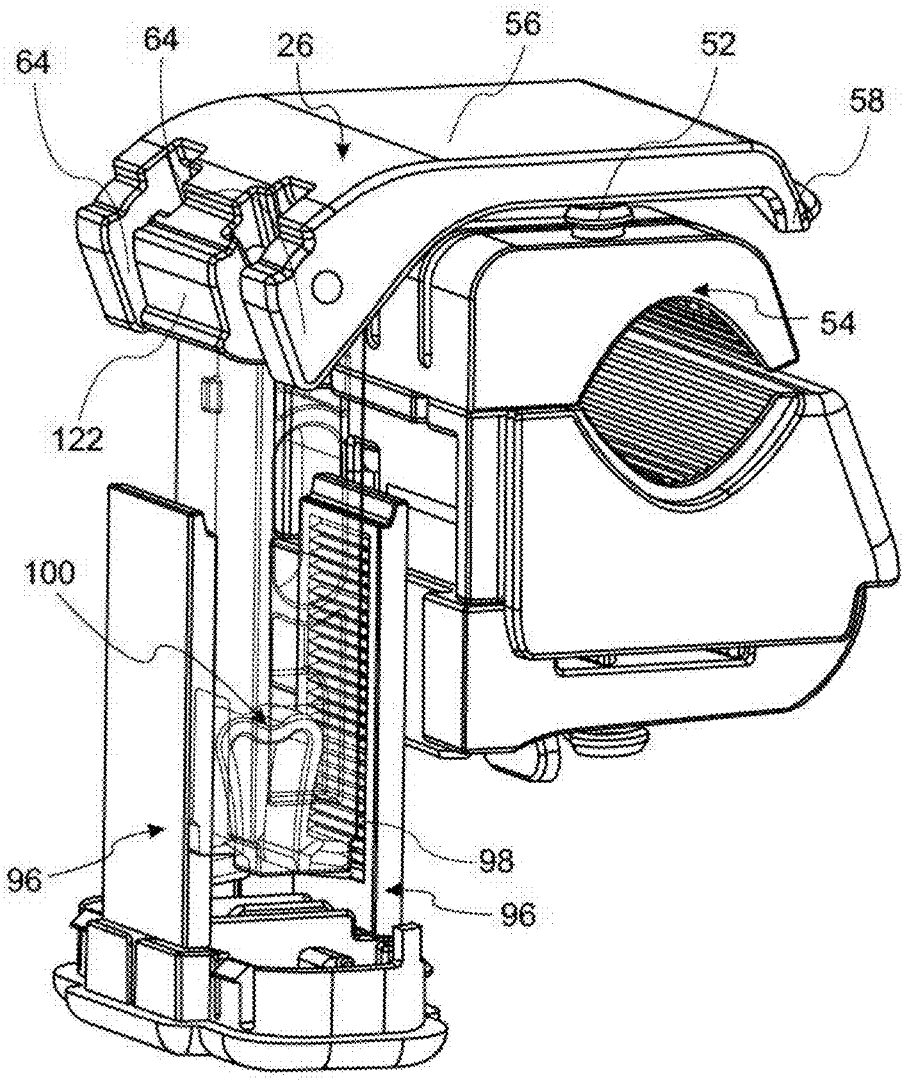
FIG. 9 is a side perspective view of the mount of FIG. 7B wherein the anchor is omitted and a mover of the mount is substantially transparent.
Figure 10:
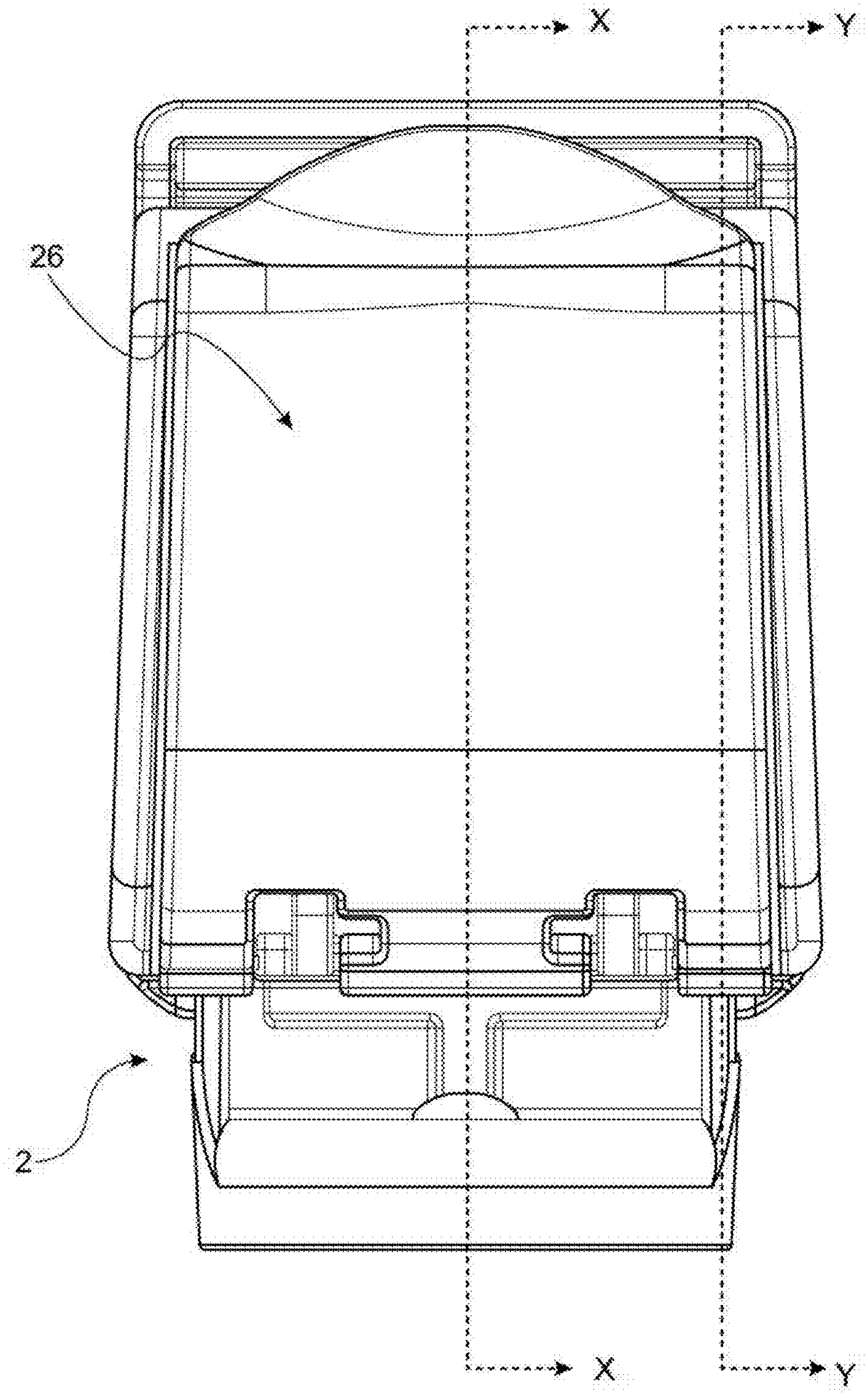
FIG. 10 is a top view of the mount of FIG. 1 wherein the connector thereof is omitted.

FIG. 9 shows a latch 26 according to embodiments of the present mount 2, the latch 26 shown in the closed state thereof. The latch 26 comprises a generally planar upper portion 56 and a forward lever end 58 which can be manually lifted to pivot the latch 26 to the open state and permit movement of the second jaw 8. In the closed state of the latch, lever end 48 can at least partially protrude outwardly with respect to the second jaw so as to facilitate manual engagement by a user (for example, a user can grasp onto the lever end to lift the latch; when the latch is open).

In the depicted example, and as will be discussed, the latch 26 is pivotally linked to an anchor 60 via a pivot pin 62. As such, the latch 26 is configured to pivot about the pin 62 as indicated by the dashed line P-P in FIG. 1. A rearward end of the latch 26 curves downwardly to form a pair of lateral arms 64 of the latch 26. Each arm 64 comprises a generally planar contact region or face 66, which proceeds downwardly to a curved tip defining a respective engagement region 68 of the latch 26. As will be discussed, the lateral arms 64 are configured to engage the second jaw 8. In particular, when the latch 26 is in the open state (see FIG. 12 for example), the generally flat contact regions 66 can be engaged by the upper platform regions 48 of the second jaw 8 such that movement of the second jaw 8 upwardly away from the first jaw 6 acts to correspondingly lift the latch 26 away from the body 4. As will also be discussed, when the latch 26 is moved to the locked state, the engagement region 68 is configured to abut against the respective platforms 48 of the second jaw 8 and thus urge the second jaw 8 in a downward direction so as to push the second jaw 8 closer toward the first jaw 6.

Examples of the present mount also comprise an anchor that acts to bias the upper jaw toward the lower jaw. For example, the anchor may, in a normally lowered position thereof, be substantially housed within the housing portion of the body. As previously mentioned, the latch may be pivotally linked to the anchor such that movement of the latch away from the body (e.g., when the latch is raised upwardly by the second jaw being moved to the distanced positions) correspondingly lifts the anchor from the lowered position to a raised position wherein the anchor is at least partially raised out of the housing portion of body. The anchor is resiliently connected with the body such that when the anchor is raised, the anchor is biased to return to the lowered position within the housing portion of the body. It is envisaged that the anchor is in mechanical communication with the second jaw such that the return of the anchor from the raised position toward the lowered position correspondingly acts to move the second jaw toward the first jaw; in other words, the bias of the anchor toward the lowered position correspondingly biases the upper jaw toward the first jaw.

Figure 7A:
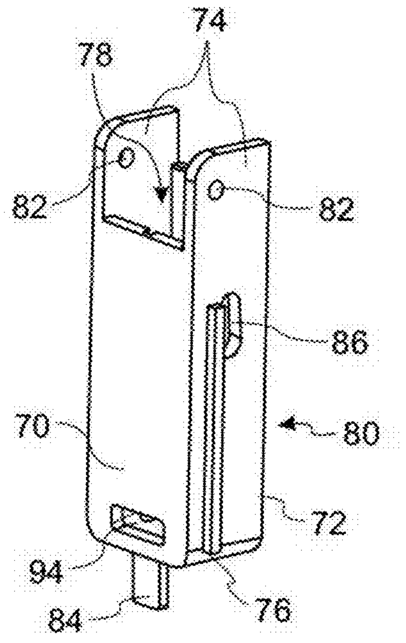
FIG. 7A is a rear perspective view of an anchor of the mount of FIG. 1.
Figure 11:
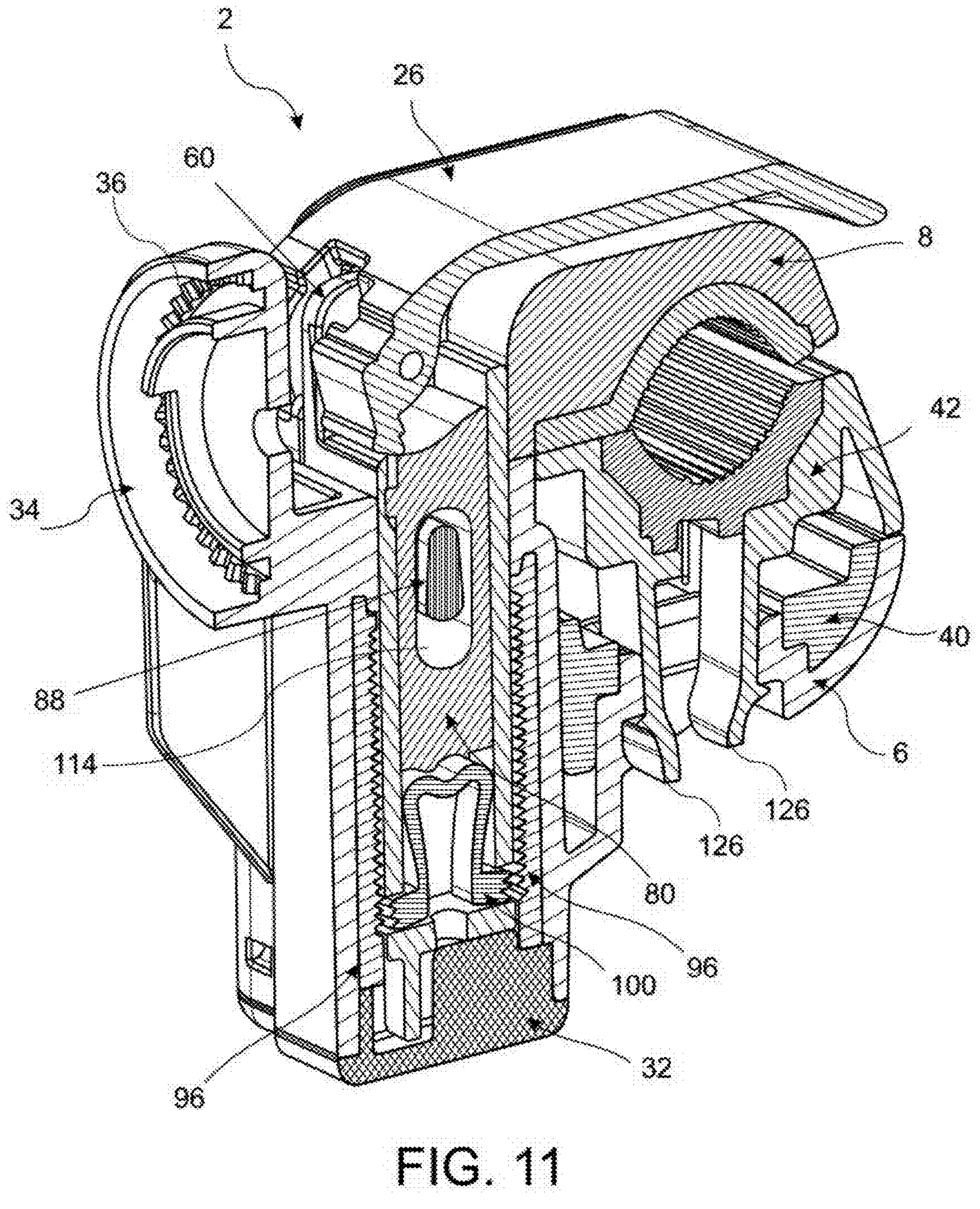
FIG. 11 is a cross-sectional view of the mount of FIG. 10 taken along the plane X-X thereof, the second jaw shown in a normally closed position and a latch of the mount shown in a closed state.

FIG. 7A shows an example anchor 60 of the presently depicted mount 2. The anchor 60 comprises front and rear walls 70, 72 interconnected by a pair of lateral side walls 74, and a floor 76, the walls 70, 72, 74 and floor 76 defining an internal slot or space 78 of the anchor 60 within which a mover component 80 of the mount 2 is housed, as will be discussed. The upper end of each side wall 74 comprises a respective opening 82 through which the pin 62 pivotally links the latch 26 relative to the anchor 60. A base 84 of the anchor 60 comprises a stopper 84 configured to abut against the base element 32 of the housing portion 28 of the body 4 so as to limit downward travel of the anchor 60 within the housing portion 28 of the body 4 (see FIG. 11).

Figure 6B:
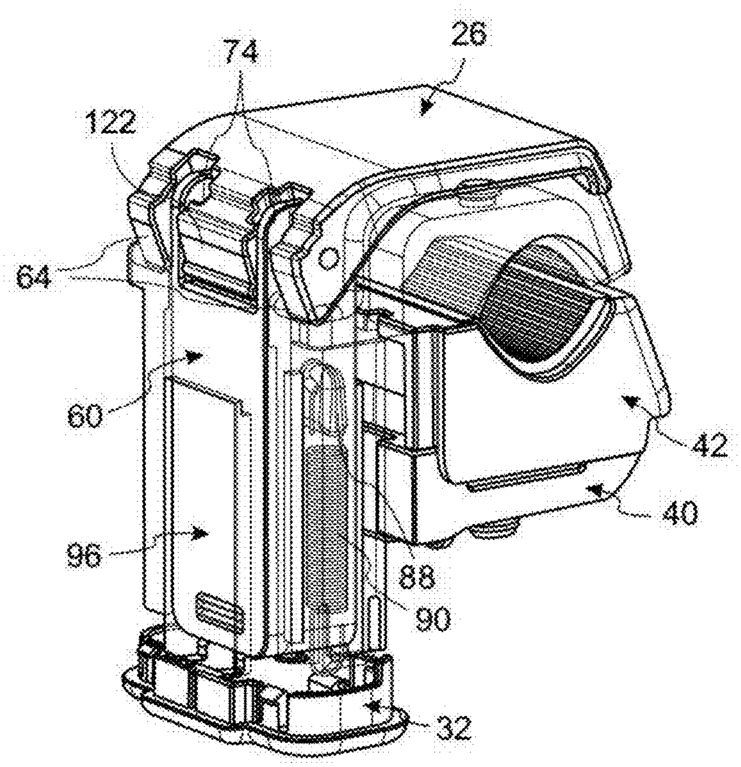
FIG. 6B is a rear perspective view of the mount of FIG. 5A wherein the body is omitted and the second jaw is substantially transparent.
Figure 7B:
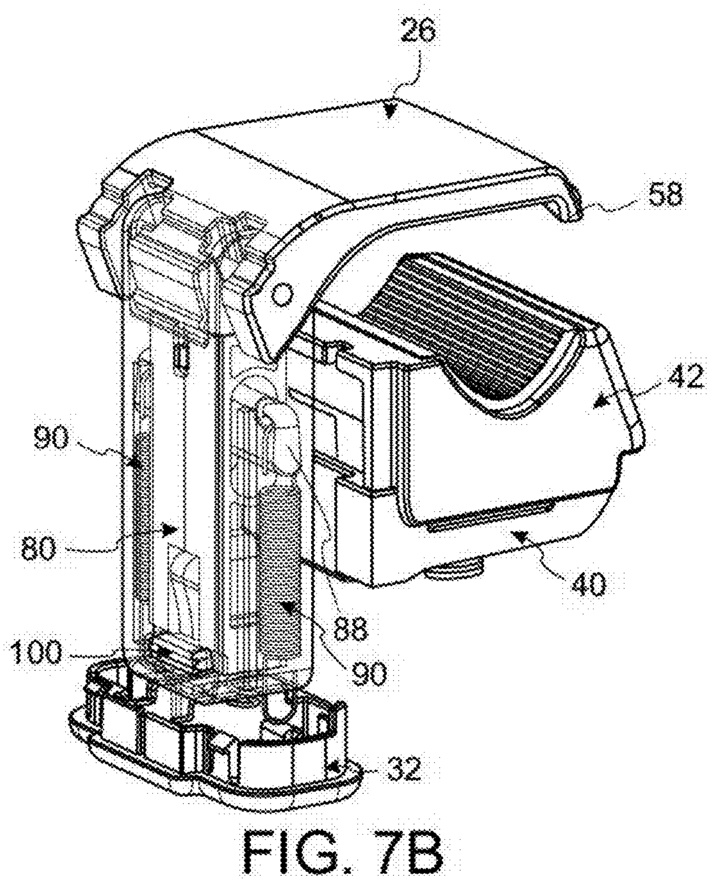
FIG. 7B is a rear perspective view of the mount of FIG. 6B wherein the second jaw is omitted and the anchor is substantially transparent.
Figure 8:
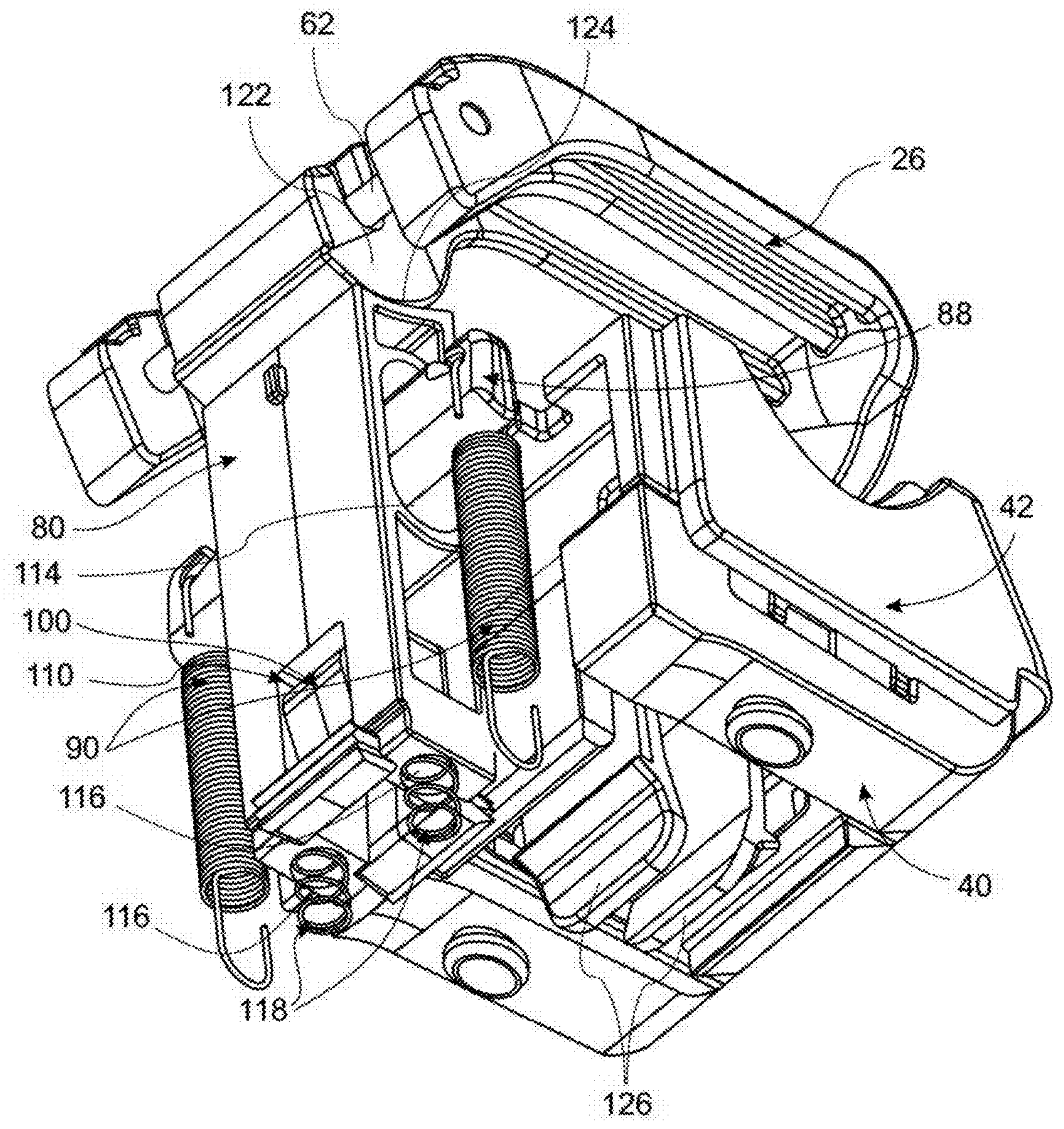
FIG. 8 is a bottom perspective view of the mount of FIG. 7B wherein the anchor and a base of the mount are omitted.

Referring also to FIG. 7B, each lateral wall 74 of the anchor 60 comprises a respective opening 86, the openings 86 being aligned with one another so as to receive therethrough an elongate yoke 88, also shown in FIG. 8. Opposite ends of the yoke 88 are configured to receive an upper end of a respective extension spring 90, wherein the bottom end of each spring 90 is connected to the base element 32 which closes a base of the body 4. As such, when the anchor 60 is raised upwardly out of the housing portion 28 of the body 4, the springs 90 are extended and thus exert a pulling force that biases the anchor 60 back toward to the normally lowered position within the housing portion 28 of the body 4. Since the anchor 60 is connected to the latch 26 (via pivot pin 62), downward movement of the anchor 60 back to the lowered position correspondingly pulls the latch 26 downwardly toward the body 4. During this downward movement of the latch 26, each lateral arm 64 thereof contacts the respective platforms 48 of the second jaw 8, thereby pulling the second jaw 8 downwardly toward the first jaw 6. In this way, the anchor 60, which is resiliently associated with the body 4 via the extension springs 90, acts to bias the second jaw 8 toward the first jaw 6 when the first jaw 6 is pulled away therefrom. Referring also to FIGS. 6A and 6B, the anchor 60 is arranged between the opposed rearward legs 46 of the second jaw 8, wherein each extension spring 90 is accommodated within an inwardly facing vertical channel 92 of each leg 46 of the second jaw 8.

Referring again to FIG. 7A, a bottom of the front and rear walls 70, 72 of the anchor 60 is provided with a respective slot 94. As will be discussed, the slots 94 are configured to receive therethrough respective portions of a locker component of the mount 2 which functions to lock a position of the anchor 60 relative to the body 4, thereby locking the position of the latch 26 and thus the second jaw 8 relative to the first jaw 6.

The mount according to examples of the presently disclosed subject matter also comprises a locking mechanism for locking a position of the second jaw relative to the first jaw. In particular, when the second jaw is in the clamping position whereby the jaws have clampingly closed around a structure, the latch can be pivoted from the open state to the locking state so as to not only urge the second jaw further toward the first jaw, but also to lock this position of the second jaw such that it is fixed in the locked position. In particular, by pivoting the latch to the locking state, not only does the latch act to reduce the distance between the jaws to a distance that is smaller than the clamping distance, the latch also actuates the locking mechanism which acts to prevent movement of the second jaw away from the first jaw. In other words, pivoting the latch to the locking state has the effect of both tightening the jaws around a structure and also locking the jaws in this tightened position so that the mount firmly clamps to the structure. This strong and sturdy clamping of the mount to a structure ensures that when an accessory such as a rocker is secured to the mount, a substantial proportion of any motion generated by the rocker is transferred to the structure rather than moving the mount relative to the structure and/or moving components of the mount itself relative to each other. Examples of the present mount thus comprise a locking mechanism that is actuated by the latch, and in particular, when the latch is pivoted to the locking state thereof.

The locking mechanism of the mount may comprise one or more locating elements and a locker configured to selectively engage or disengage the or each locating element so as to respectively lock and unlock movement of the second jaw relative to the first jaw. For example, the locker may be operable between a neutral configuration in which the locker is normally disengaged from the locating elements so that the second jaw is movable relative to the first jaw, and an extended configuration wherein the lock is engaged with the locating elements so as to lock the second jaw in the locked position. In certain embodiments, it is envisaged that the locker may comprise a resilient component that can be urged, either directly or indirectly, by the latch in the locking state thereof so as to assume the extended configuration. In such embodiments, the locker is biased to return to the neutral configuration such that when the latch is moved out of the locked state to the open state, the locker returns to the neutral configuration, thereby disengaging from the locating elements so as to no longer inhibit movement of the second jaw relative to the first jaw.

FIG. 9 illustrates portions of a locking mechanism of the presently depicted example mount 2. The locking mechanism comprises a pair of spaced apart locating elements in the form of vertically extending racks 96 housed within the housing portion 28 of the body 4. Each rack 96 comprises a set of elongate teeth 98, each set 98 extending vertically along an inner face of a respective rack 96. Referring also to FIG. 6B, the teeth 98 of one rack 96 are disposed proximate to the front wall 70 of the anchor 60, and the teeth 98 of the other rack 96 are disposed proximate to the rear wall 72 of the anchor 60. Referring back to FIG. 9, the locker 100 is depicted as a resilient component disposed between the locating racks 96, the locker 100 having a head portion 102 and two leg portions 104 extending downwardly from opposite ends of the head portion 102. The lower end of each leg 104 terminates in an outwardly extending foot 106, wherein an outer end of each foot 106 comprises teeth 108 configured to engage or mesh with the teeth 98 of an adjacent rack 96. The mount 2 is configured such that when the teeth 108 of the locker 100 engage with the teeth 98 of the locating racks 96, the second jaw 8 is locked in place relative to the first jaw 6, and when the teeth 108 of the locker 100 are not engaged with the teeth 98 of the locating racks 96, the second jaw 8 is movable relative to the first jaw 6 (provided that the latch 26 is in the open state).

Figure 18:
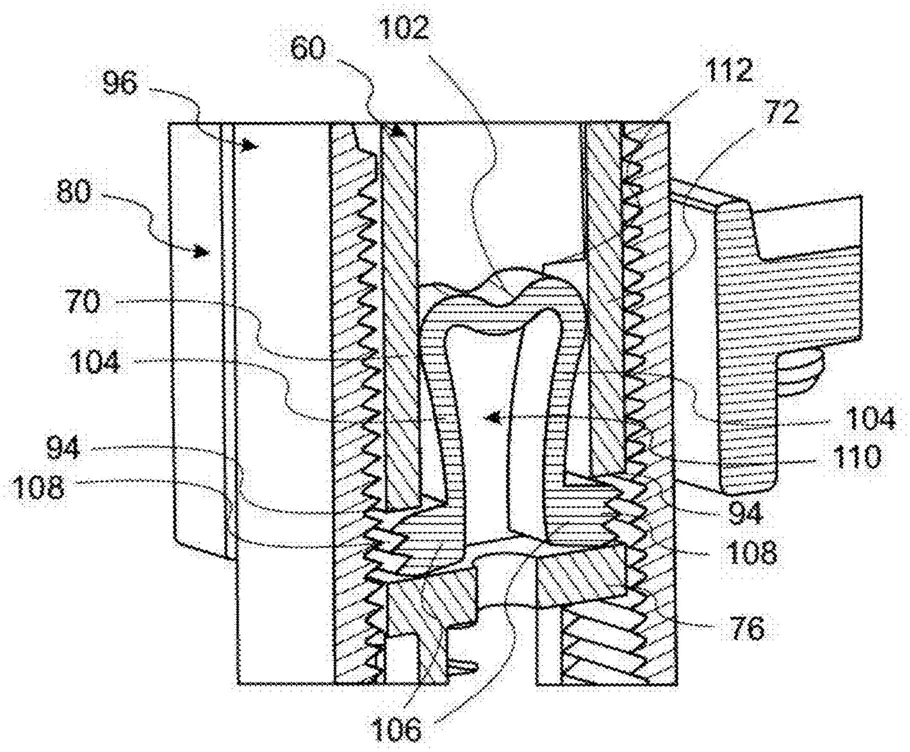
FIG. 18 is a close-up view of a locker and locating elements of a locking mechanism of the mount of FIG. 17.

As previously discussed, the bottom of the front and rear walls 70, 72 of the anchor 60 comprise respective openings 94 for accommodating the locker 100 of the mount 2. This is shown in FIG. 18, which shows each foot 106 accommodated or nested within a respective lower opening 94 of the anchor 60. When the locker 100 is in a neutral configuration, the feet 106 thereof do not protrude out through the lower openings 94 of the anchor 60 and thus do not engage the teeth 98 of the locating racks 96. However, when the latch 26 is moved to the locking state, the locker 100 is configured to be urged to an extended configuration wherein the leg portions 104 splay outwardly and the respective feet 106 protrude at least partially out through the lower openings 94 of the anchor 60 so that the teeth 108 of the feet 106 engage the teeth 98 of the adjacent locating racks 96, thereby locking a position of the locker 100 relative to the racks 96. Since the feet 106 of the locker 100 are accommodated in correspondingly sized lower openings 94 in the anchor 60, when the locker 100 engages the racks 96 so as to be fixed in place, the anchor 60 is correspondingly fixed in place and cannot be moved vertically relative to the body 4. As previously described, since movement of the second jaw 8 is linked to movement of the anchor 60, by locking the anchor 60 in place, the second jaw 8 is correspondingly locked in position relative to the first jaw 6 and thus cannot be moved away therefrom.

The presently disclosed mount also comprises a mover component that is configured to, when the latch is pivoted to the locking state, urge the locker from the neutral configuration to the extended configuration so as to lock the second jaw in the locked position. Referring to FIGS. 7B and 8, the mover 80 has a generally rectangular body that is housed within the anchor 60 of the mount 2. A bottom of the mover is formed with an opening 110 in which the locker 100 is accommodated. In particular, and with reference to FIG. 18, a top surface 112 of the opening 110 in the mover 80 is disposed above and adjacent the head portion 102 of the locker 100. As will be discussed, when the mover 80 is depressed downwardly by the latch 26, the top surface 112 of the opening 110 of the mover 80 presses downwardly on the head portion 102 of the locker 100, thereby urging the locker 100 to the extended configuration whereby the teeth 108 of the feet 106 thereof engage with the teeth 98 of the adjacent racks 96 to lock the position of the second jaw 8.

As can be seen in FIG. 8, the mover 80 is formed with a transverse through hole 114 that is aligned with the side wall openings 86 of the anchor 60 through which the yoke extends 88; in other words, the yoke 88 extends through both the mover 80 and the anchor 60. However, a height of the through hole 114 in the mover 80 is greater than that of the side wall openings 86 of the anchor 60. As such, the mover 80 can move slightly vertically up and down relative to the anchor 60. In other words, since the through hole 114 of the mover 80 provides additional clearance around the yoke 88, the yoke 88 and the anchor 60 can travel up and down slightly relative to the mover 80. It is not until the yoke 88 and thus anchor 60 are raised beyond a certain point whereby the yoke 88 also contacts the mover 80 that the mover 80 is correspondingly raised by upward movement of the anchor 60. Put another way, there is a degree of play in the vertical direction between the anchor 60 and the mover 80.

Referring to FIG. 8, the base of the mover 80 comprises a pair of lateral openings 116, each configured to receive a respective compression spring 118, an upper end of which engages the mover 80 and a lower end of which engages the base element 32 which closes a bottom of the housing portion 28 of the body 4. As such, if the mover 80 is urged downwardly, the compression springs 118 are compressed and thus act to urge the mover 80 to return upwardly relative to the anchor 60 in which the mover 80 is housed. A top surface of the mover 80 comprises a depressing surface 120 which is configured to be urged downwardly by the latch 26. In particular, between the lateral arms 64 of the latch 26 is formed a central arm 122 having an actuation region 124 configured to, when the latch 26 is pivoted to the locking state, engage the depressing surface 120 so as to urge the mover 80 downwardly against the compression springs 118. This downward urging of the mover 80 acts to push the mover 80 downwardly relative to the anchor 60, thereby causing the top surface 112 of the opening 110 of the mover 80 to press downwardly against the head portion 102 of the locker 100, which in turn causes the locker 100 to assume the extended configuration so as to lock against the racks 96 and thereby lock the position of the second jaw 8 relative to the first jaw 6. When the latch 26 is pivoted to the open state, the compression springs 118 are able to expand, thereby raising the mover 80 relative to the anchor 60 so that the top surface 112 of the opening 110 of the mover 80 lifts off the head portion 102 of the locker 100, thereby allowing the locker 100 to return to its neutral condition so that the locker 100 no longer engages the racks 96 and thus enables movement of the second jaw 8 relative to the first jaw 6.

A sequence of latch states and corresponding jaw positions of the mount 2 will now be described with reference to FIGS. 11 to 17. Starting with FIG. 11, the upper jaw 8 of the depicted mount 2 is shown in the normally closed position and the latch 26 is in the closed state so as to prevent movement of the second jaw 8 away from the first jaw 6. In this configuration, the pair of jaws 6, 8 are proximate to one another and insufficiently spaced apart from one another to permit reception of a structure therebetween. In certain embodiments, the actuation region 124 of the latch 26 in the closed state may sufficiently depress the mover 80 such that the locker 100 correspondingly locks the position of the second jaw 8 in the normally closed position.

Figure 12:
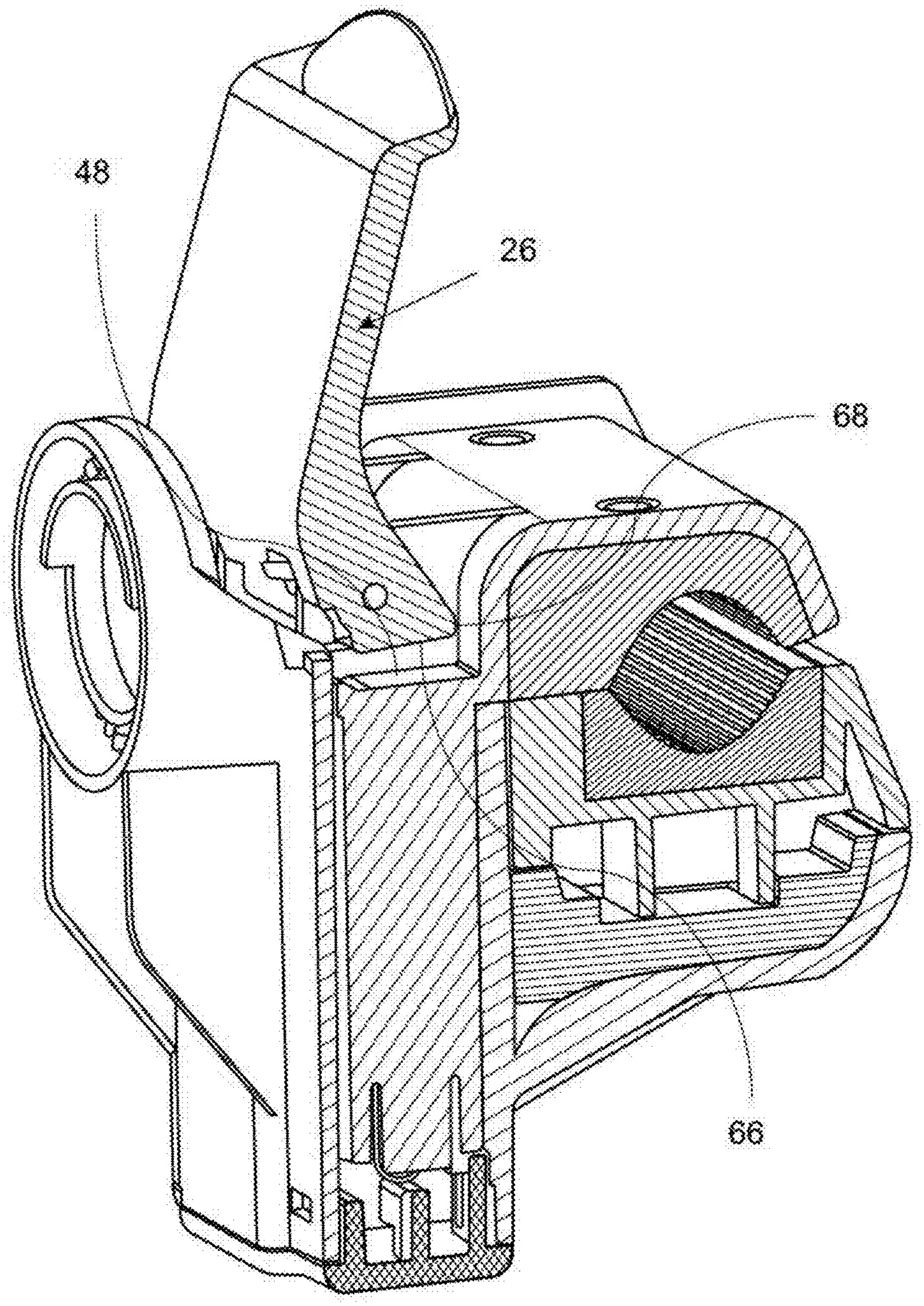
FIG. 12 is a cross-sectional view of the mount of FIG. 10 taken along the plane Y-Y thereof, wherein the latch is shown in an open state.
Figure 13:
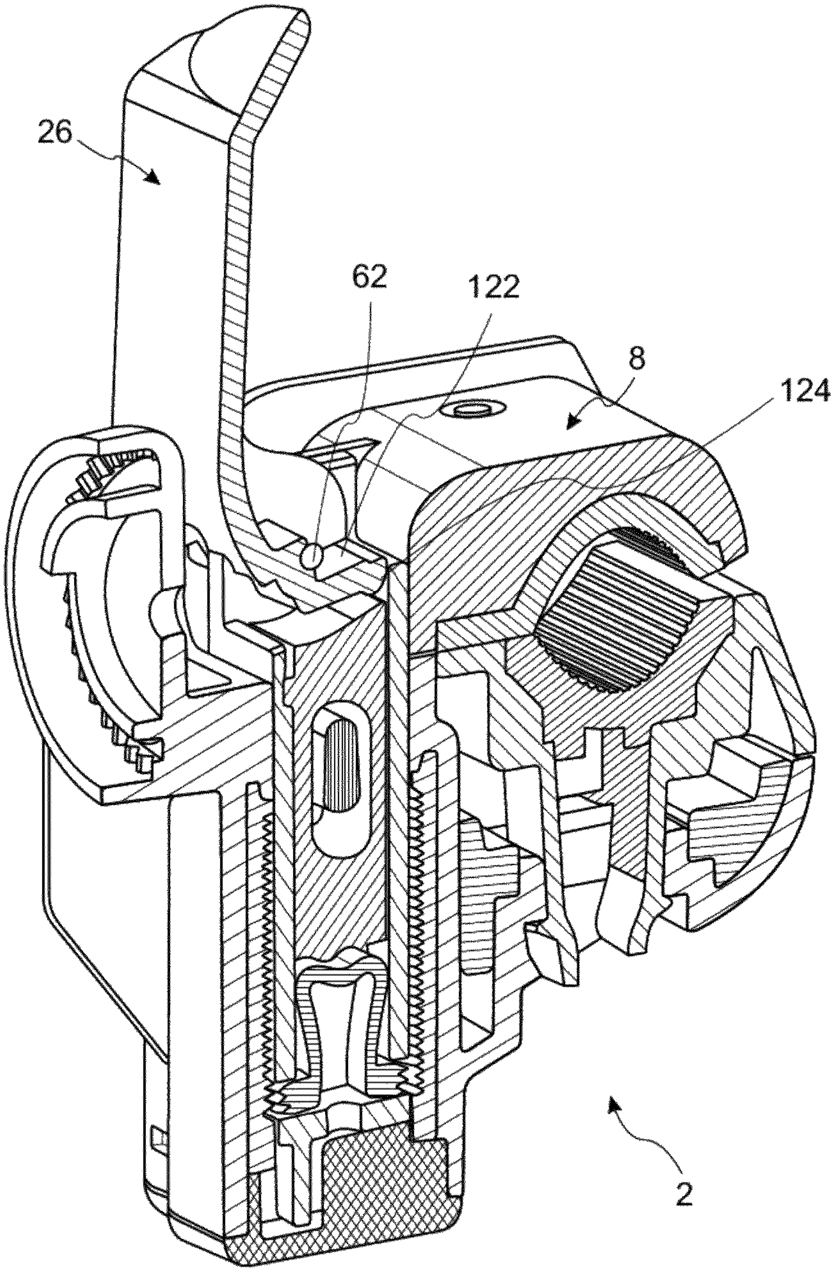
FIG. 13 is a cross-sectional view of the mount of FIG. 10 taken along the plane X-X thereof, wherein the latch is shown in an open state.

Proceeding to FIG. 12, the latch 26 is pivoted rearwardly to the open state, wherein the second jaw 8 can be moved away from the first jaw 6. It can be seen that the engagement region 68 of the lateral arms 64 of the latch 26 is vertically spaced from the underlying platform region 48 of the respective legs 46 of the upper jaw 8. By raising the upper jaw 8 upwardly, the platform regions 48 abut and engage the respective engagement regions 68 of the latch 26, thereby raising the latch 26 upwardly and thus lifting the anchor 60 upwardly to the raised position. FIG. 13 also shows the latch 26 in the open state and before the second jaw 8 is moved to a distanced position, though taken at the plane X-X. As can be seen, the actuation region 124 of the opened latch 26 is also clear from the depressing surface 120 of the mover 80; as such, the mover 80 is moved upwardly via the expansion of the compression springs 118 so that the mover 80 does not press downwardly on the locker 100 and thus the position of the second jaw 8 is not locked in place.

Figure 14:
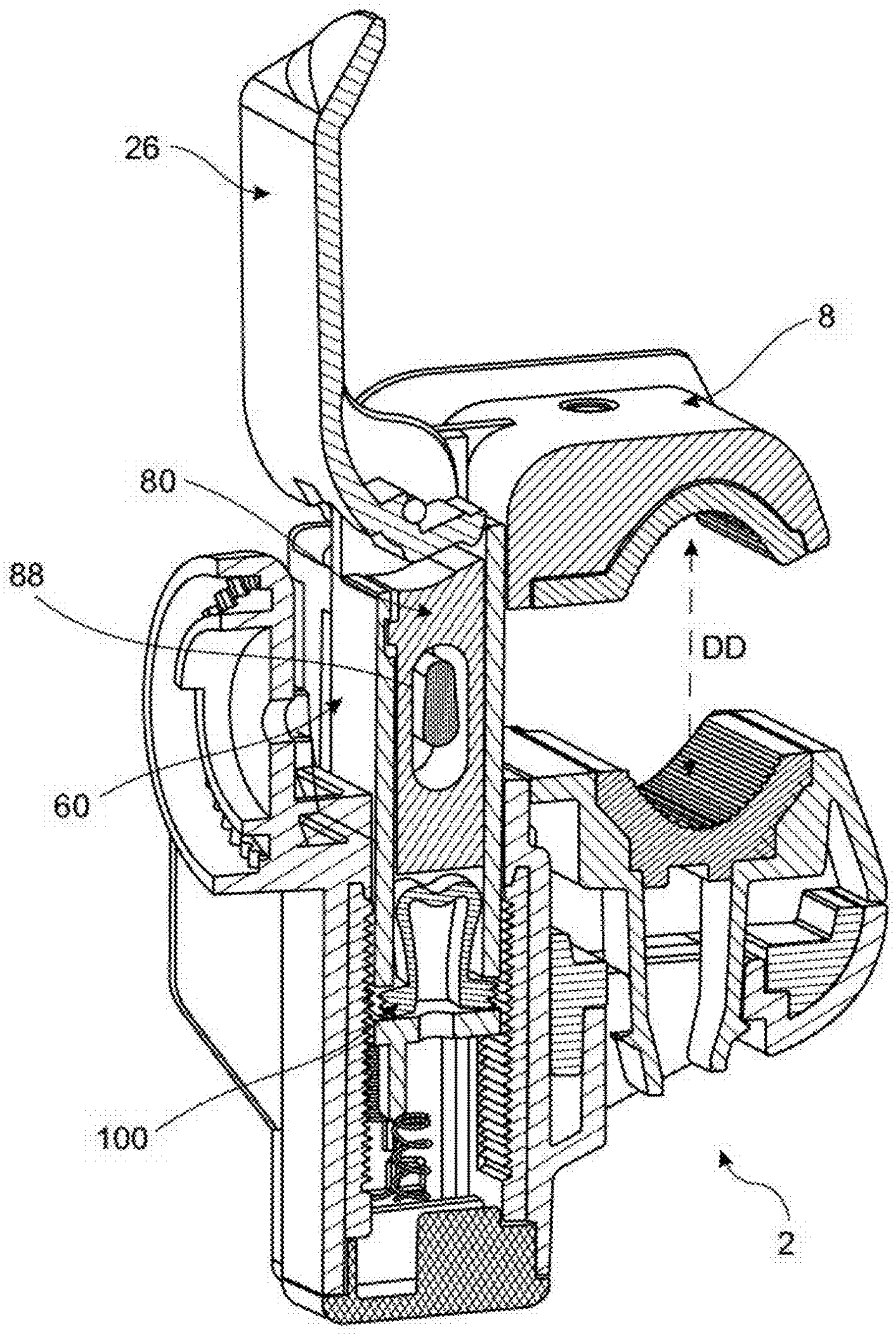
FIG. 14 is the cross-sectional view of the mount of FIG. 13, wherein the second jaw is moved to a distanced position that is spaced from a first jaw of the mount.
Figure 15:
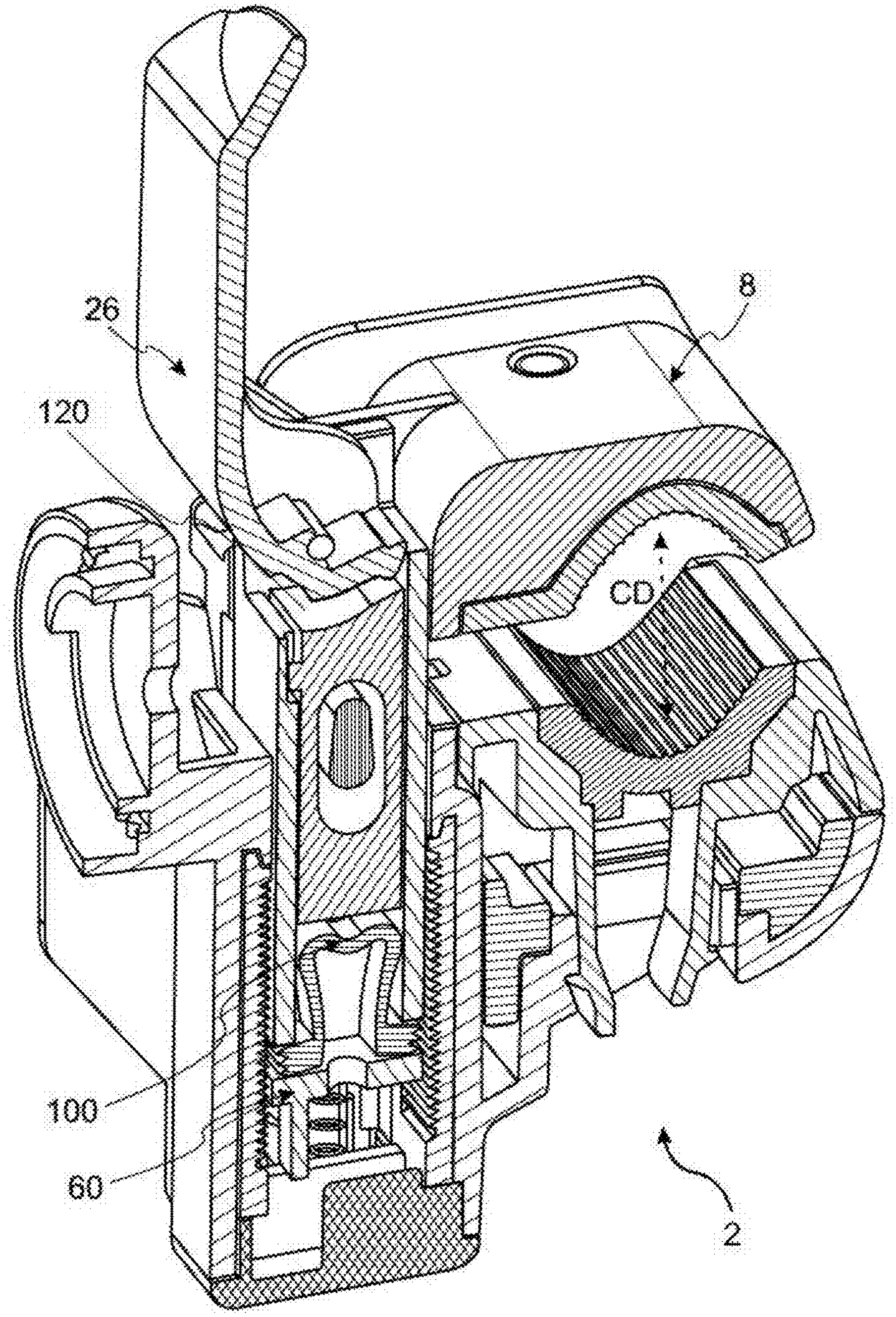
FIG. 15 is a cross-sectional view of the mount of FIG. 14, wherein the second jaw is moved to a clamping position.

FIG. 14 shows the upper jaw 8 moved to a distanced position which is associated with a distance DD that is greater than the clamping dimension of the structure to be received between the jaws 6, 8. As can be seen, upward movement of the second jaw 8 correspondingly raises the latch 26 and thus anchor 60, mover 80, and locker 100. After a structure has been received between the jaws 6, 8, the second jaw 8 can be manually released so that it returns toward the first jaw 6 as a result of the spring bias of the anchor 60. In particular, upon release of the second jaw 8, the extension springs 90 pull the yoke 88 and thus anchor 60 downwardly into the housing portion 28 of the body 4, which downward motion pulls the pivotally linked latch 26 downwardly, whereby the lateral arms 64 of the latch 26 engage the lateral platforms 48 of the upper jaw 8 so as to correspondingly urge the upper jaw 8 downwardly toward the first jaw 6 such that the pair of jaws 6, 8 clampingly close around the structure. FIG. 15 shows the mount 2 with the second jaw 8 in the clamping position wherein the two jaws 6, 8 are separated by a clamping distance CD, the clamping distance CD being smaller than the distance DD between the jaws 6, 8 when the second jaw 8 is in the distanced positions.

Figure 16:
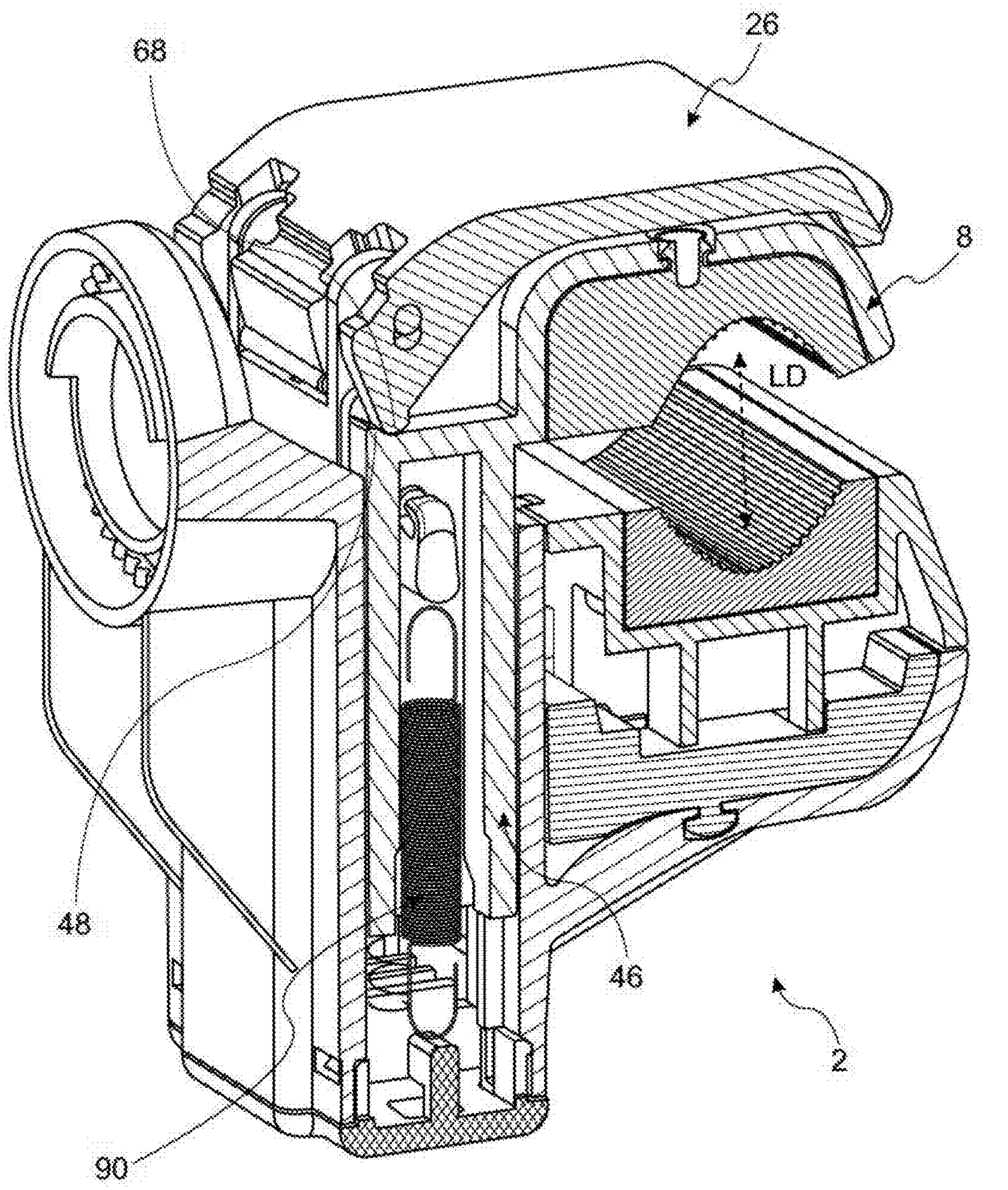
FIG. 16 is a cross-sectional view of the mount of FIG. 10 taken along the plane Y-Y wherein the latch is in a locking state so as to lock the second jaw in a locked position.
Figure 17:
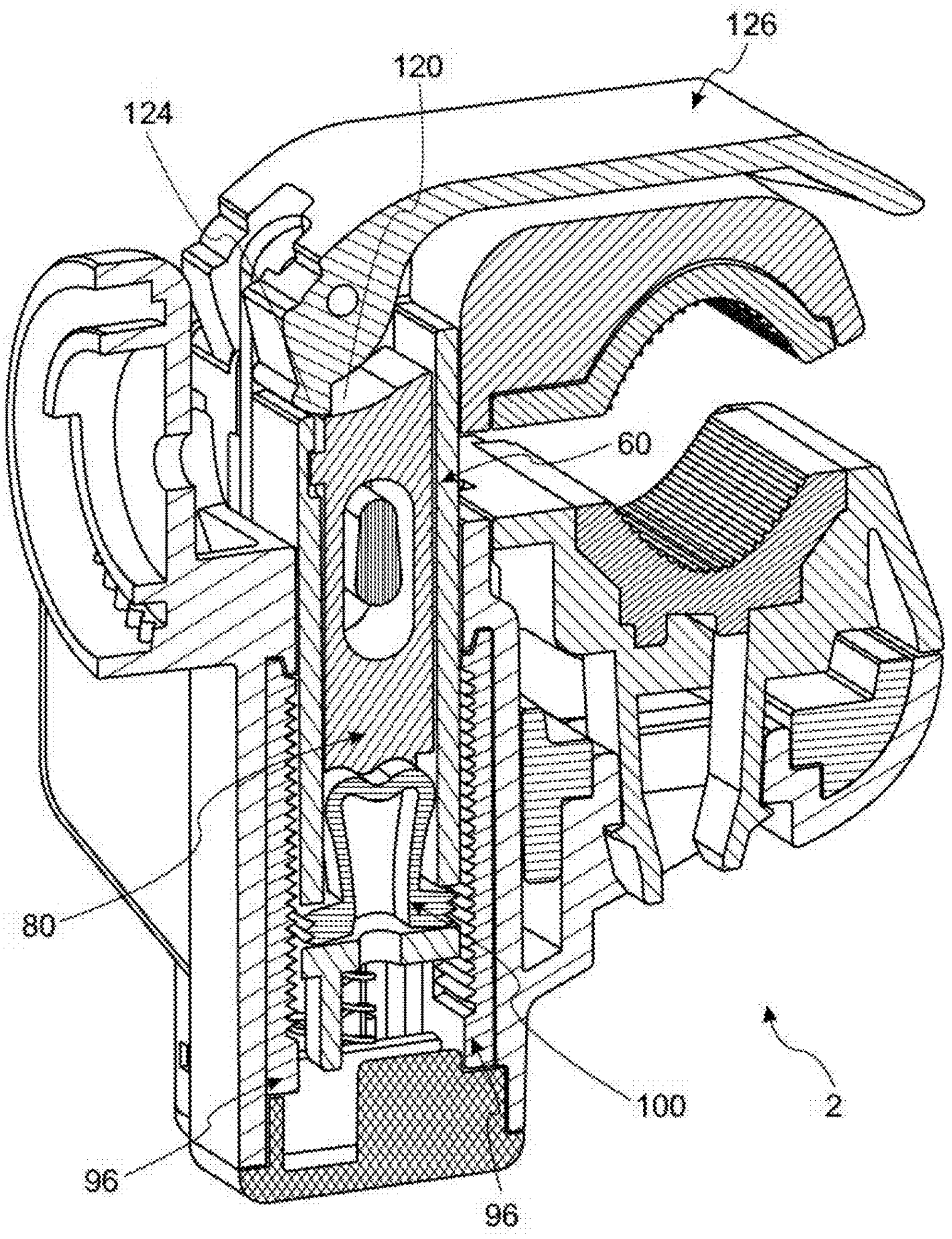
FIG. 17 is a cross-sectional view of the mount of FIG. 16 taken along the plane X-X.

Proceeding to FIG. 16, the latch 26 of the mount 2 is pivoted to the locked state, wherein the latch 26 acts to move the second jaw 8 closer to the first jaw 6, and to lock the second jaw 8 in the locked position. FIG. 16. shows a cross-sectional view of the locked mount 2 taken at the plane Y-Y to illustrate how the engagement region 68 of each lateral arm 64 of the latch 26 engages the respective upper platform 48 of the second jaw 8 so as to urge the second jaw 8 downwardly and further toward the first jaw 6, thereby tightening the hold of the jaws 6, 8 around the structure. FIG.

17 shows a cross-sectional view of the locked mount 2 taken at the plane X-X to illustrate how the actuation region 124 of the central arm 122 of the latch 26 engages and presses downwardly on the depressing surface 120 of the mover 80, thereby urging the mover 80 downwardly so that the top surface 112 of the opening 110 presses downwardly against the head portion 102 of the locker 100, causing the teeth 108 of the locker 100 to engage against the teeth 98 of the adjacent racks 96, which, in turn, locks the position of the locker 100 and thus the anchor 60, latch 26, and position of the second jaw 8 relative to the first jaw 6, as previously described.

Figure 20A:
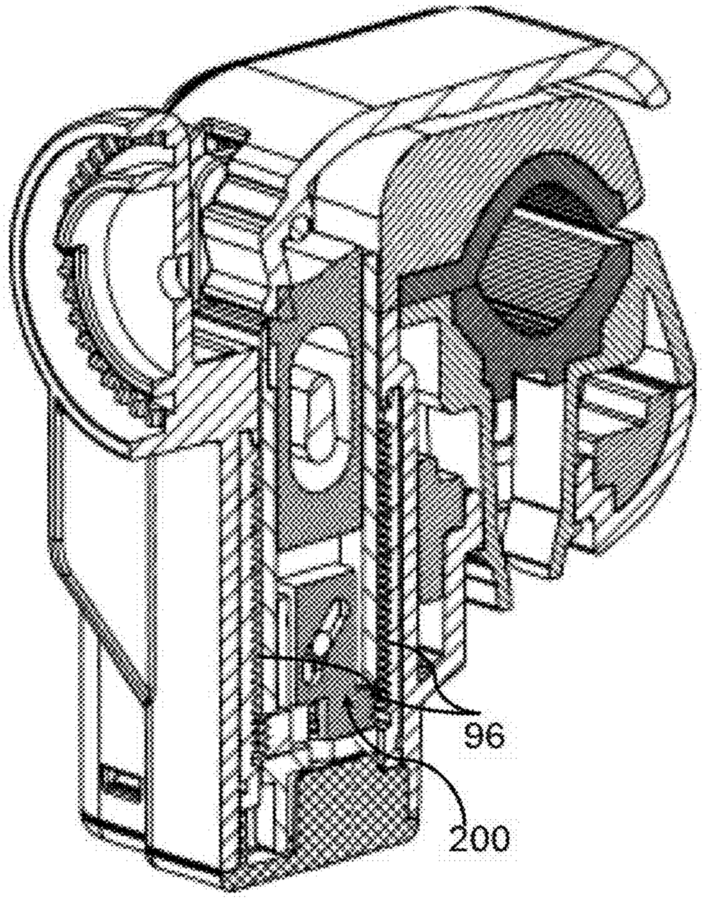
FIG. 20A is a cross-sectional view of a mount comprising another example of a locker component.
Figure 20B:
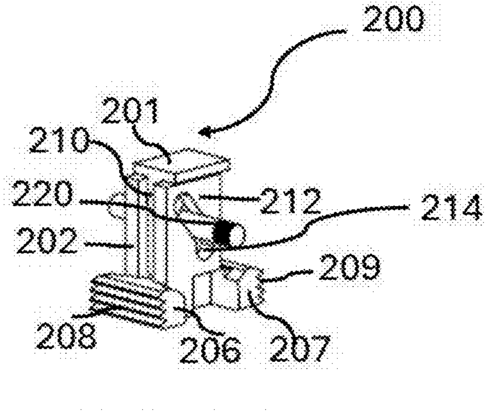
FIG. 20B is a side perspective view of the locker of FIG. 20A.
Figure 20C:
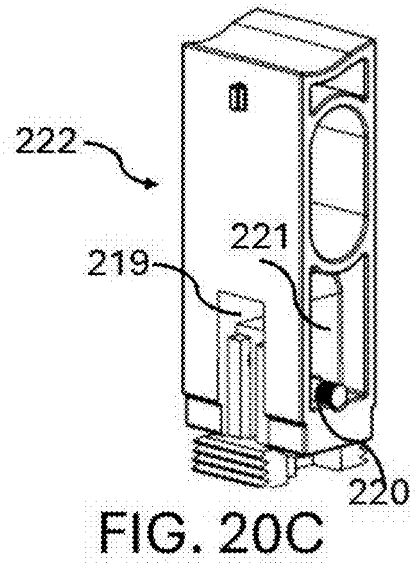
FIG. 20C is a side perspective view of a mover component in which the locker according to FIG. 20A is at least partially received.

FIGS. 20A-C illustrate another example of a locker component 200 of the locking mechanism, which is functionally similar to locker 100. Locker 200 comprises a geometrically-lockable structure, which, according to the shown example, comprises two locker portions 201 and 202. Each of the locker portions comprises: a foot 206, 207 ending with a set of teeth 208, 209 for engagement with the locating elements of the locking mechanism (e.g. locating elements in the form of vertically extending racks 96); a vertically extending body 210, 212; and a diagonally extending slot (only slot 214 of the outer portion is visible) formed in the body.

Body 212 of the second locker portion 202 defines a central recess in which body 210 of the first locker portion 201 is at least partially received. The diagonally extending slots of the locker portions extend in opposite orientations, with an overlap at their lowermost segments. As further shown, a common transversely extending pin 220 passes through the two slots and protrudes outwardly with respect to the second (outer) locker portion 202.

In use, locker 200 is configurable between two configurations, a locking (extended) configuration and an unlocked (neutral) configuration. In the locking configuration, pin 220 is located at its lowermost position within the slots, in which it is prevented by the overlapping bodies of the two locker portions from moving upwards in the slots. In the locking position, feet 206, 207 are most distant from each other, allowing the teeth sets 208, 209 to be lockably engaged to the locating elements (e.g. the racks). In the unlocked configuration, the pin is slid upwards inside the slots, thereby moving the two locker portions closer to each other and approximating the feet (and the teeth sets) closer, such that the teeth sets are no longer engaged with the locating elements.

In some examples, as shown, the locker is partially accommodated within a lower recess 219 of a mover component 222. Pin 220 extends transversely from the locker into an opening 221 of the mover, such that movement of the mover up and down manipulates the pin. For example, upward movement of the mover pulls the pin up to release the locker from the locking configuration to the unlocked configuration; and downward movement of the mover pushes down on the pin to move the pin into its lowermost position in which the locker is locked. Mover 222 is actuatable in response to movement of the latch, for example as described above with respect to mover 80—when the latch is pivoted to the locking state, the mover is pressed down, pushing on the pin and urging the locker into its locking (extended) configuration.

Throughout this specification and the claims which follow, unless the context requires otherwise, the word “comprise”, and variations such as “comprises” and “comprising”, will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

It is to be understood that various alterations, modifications and/or additions may be made without departing from the spirit of the present invention as disclosed herein. For example, the majority of the Figures depict a lower jaw 6 fitted with an adapter 42 which mirrors the clamping profile of the upper jaw 8. Of course, the adapter 42 can be removed from the jaw portion 6 of the body 4 and replaced with alternative adapters as needed. In the depicted example, the adapter 42 comprises clipping elements 126 which clip into corresponding openings formed through a base of the lower jaw portion 6 of the body 4. The clipping elements 126 can simply be manipulated (e.g., squeezed together) to effect removable of the adapter 42 from the jaw portion 6 of the body 4. Some embodiments may not include an adapter.

While it is envisaged that an accessory such as a rocker can be releasably secured to the present mount 2 (e.g., via a suitable connector), it is of course within the scope of the present specification that the mount and accessory (e.g., rocker) can be integrally formed.

The invention claimed is:

1. A mount configured to releasably clamp to a structure having a clamping dimension so as to secure an accessory relative to the structure, the mount comprising:

a body associated with a first jaw;

a second jaw that is opposed to the first jaw and movable with respect thereto from a normally closed position to distanced positions spaced from the first jaw wherein distances between the jaws are greater than the clamping dimension to permit reception of at least a part of the structure between the jaws, the second jaw being resiliently associated with the body such that the second jaw is biased toward the first jaw for closing around the structure in a clamping position of the second jaw defining a clamping distance between the jaws;

a latch pivotably connected with respect to the second jaw and movable between:

(i) a closed state in which the latch covers at least a part of the second jaw in the normally closed position thereof to prevent movement of the second jaw away from the first jaw;

(ii) an open state in which the latch is pivoted relative to the second jaw permitting the second jaw to move from the first jaw to the distanced positions; and (iii) a locking state in which the latch covers at least a part of the second jaw in the clamping position thereof, wherein in the locking state of the latch, the second jaw is locked in a locked position and is urged further towards the first jaw such that the jaws are spaced from one another by a locking distance which is smaller than the clamping distance; and a locking mechanism operative to lock the second jaw in the locked position when the latch is pivoted to the locking state.

2. The mount of claim 1, wherein the latch comprises at least:

an engagement region configured to, when the latch is pivoted to the locking state, engage against the second jaw so as to urge the second jaw; and an actuation region configured to, when the latch is pivoted to the locking state, actuate the locking mechanism so as to lock the second jaw.

3. The mount of claim 2, wherein the latch further comprises at least one contact region which, when the latch is in the open state, is configured to be engaged by the second jaw as the second jaw is moved to the distanced positions so as to correspondingly push the latch away from the body.

4. The mount of claim 3, further comprising an anchor that, in a normally lowered position thereof, is substantially housed within the body, the latch being pivotally linked to the anchor such that movement of the latch away from the body correspondingly moves the anchor to a raised position.

5. The mount of claim 4, wherein the anchor is resiliently associated with the body so as to be biased to return to the lowered position from the raised position, which return to the lowered position correspondingly returns the latch toward the body, wherein at least one of the engagement region and the contact region of the returning latch engages the second jaw so as to bias the second jaw toward the first jaw.

6. The mount of claim 5, wherein the anchor is biased to return to the lowered position by a plurality of extension springs which exert a pulling force that biases the anchor to the lowered position.

7. The mount of claim 1, wherein the locking mechanism comprises:

one or more locating elements; and a locker configured to:

engage the or each locating element to lock the second jaw in the locked position when the latch is pivoted to the locking state from the open state; and disengage from the or each locating element to release the second jaw from the locked position when the latch is pivoted from the locking state to the open state.

8. The mount of claim 7, wherein the locker is operable between:

a neutral configuration in which the locker is disengaged from the or each locating element; and an extended configuration in which the locker is engaged with the or each locating element.

9. The mount of claim 8, wherein the locker comprises a resilient body or a geometric assembly that is urgeable from the neutral configuration to the extended configuration.

10. The mount of claim 7, wherein the locking mechanism further comprises a mover configured to be urged by the actuation region of the latch in the locking state thereof so as to correspondingly urge the locker from the neutral configuration to the extended configuration so as to lock the second jaw in the locked position.

11. The mount of claim 10, further comprising:

an anchor that, in a normally lowered position thereof, is substantially housed within the body, the latch being pivotally linked to the anchor such that movement of the latch away from the body correspondingly moves the anchor to a raised position;

wherein the mover is substantially housed within the anchor, so as to:

move with the anchor relative to the body as the latch is moved relative to the body; and move relative to the anchor to urge the locker to the extended configuration when the latch is moved to the locking state.

12. The mount of claim 7, further comprising a pair of opposed and spaced apart locating elements housed in the body, each locating element comprising a rack; and wherein the locker comprises corresponding opposing teeth for engaging the racks to lock the second jaw in the locked position.

13. The mount of claim 1, wherein the locking mechanism is at least partially housed within the body.

14. The mount of claim 1, wherein the second jaw comprises at least one rearwardly disposed leg configured to be at least partially housed within the body, the at least one leg being configured to move within the body as the second jaw is moved relative to the first jaw.

15. The mount of claim 14, wherein the latch comprises at least:

an engagement region configured to, when the latch is pivoted to the locking state, engage against the second jaw so as to urge the second jaw;

an actuation region configured to, when the latch is pivoted to the locking state, actuate the locking mechanism so as to lock the second jaw; and at least one contact region which, when the latch is in the open state, is configured to be engaged by the second jaw as the second jaw is moved to the distanced positions so as to correspondingly push the latch away from the body;

wherein an upper end of the at least one leg comprises a platform configured to be engaged by:

the engagement region of the latch when in the locked state thereof so as to urge the second jaw further toward the first jaw; and the contact region of the latch when in the open state thereof such that movement of the second jaw away from the first jaw correspondingly raises the latch away from the body.

16. The mount of claim 1, wherein the latch comprises a lever end which, in the closed and locking state of the latch, at least partially protrudes outwardly with respect to the second jaw to facilitate manual engagement of the latch by a user.

17. The mount of claim 1, further comprising an adapter which is removably securable to the first jaw so as to provide the first jaw with an alternate clamping profile.

18. The mount of claim 1, further comprising a connector via which the accessory is securable to the mount.

19. The mount of claim 18, wherein the connector is mounted or is integrally formed on a back portion of the body, facing away from the first and second jaws.

20. The mount of claim 18, wherein the connector comprises a dial that is rotatable relative to the body such that an angular position of the accessory relative to the body can be adjusted.

21. The mount of claim 1, wherein the structure in respect of which the mount is clampable comprises a leg or handle of a stroller, wherein the clamping dimension comprises a thickness of the leg or handle of the stroller.

22. An assembly, comprising:

the mount according to claim 1; and an accessory comprising a rocker.

23. The assembly of claim 22, wherein the rocker is configured to generate a motion which is substantially transferred through the mount to the structure in respect of which the mount is clamped, at least when the second jaw is in a locked position.

24. The assembly of claim 22, wherein the motion comprises at least one of:

rocking and vibrating.

25. The assembly of claim 22, wherein the mount and rocker are integrally formed.

* * * * *